(12) United States Patent
Wensley et al.

(10) Patent No.: US 7,198,870 B2
(45) Date of Patent: *Apr. 3, 2007

(54) POLYIMIDE MATRIX ELECTROLYTE

(75) Inventors: C. Glen Wensley, Lakeland, FL (US); Alain Vallée, Varennes (CA); Dany Brouillette, Brossard (CA); Scott Gustafson, Lakeland, FL (US)

(73) Assignees: Solicore, Inc., Lakeland, FL (US); Avestor Limited Partnership, Boucherville, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/191,922

(22) Filed: Jul. 29, 2005
(Under 37 CFR 1.47)

(65) Prior Publication Data

US 2006/0177740 A1 Aug. 10, 2006

Related U.S. Application Data

(63) Continuation of application No. 10/437,559, filed on May 13, 2003, now abandoned.

(51) Int. Cl.
*H01M 6/18* (2006.01)

(52) U.S. Cl. .................. 429/314; 429/317; 429/339; 429/249; 429/307

(58) Field of Classification Search ................ 429/314, 429/317, 339, 249, 307
See application file for complete search history.

(56) References Cited

U.S. PATENT DOCUMENTS

| | | | |
|---|---|---|---|
| 5,019,467 A | 5/1991 | Fujiwara | |
| 5,056,145 A | 10/1991 | Yamamoto et al. | |
| 5,468,571 A | 11/1995 | Fujimoto et al. | |
| 5,677,568 A | 10/1997 | Ochi et al. | |
| 5,735,040 A | 4/1998 | Ochi et al. | |
| 5,888,672 A | 3/1999 | Gustafson et al. | |
| 5,895,731 A | 4/1999 | Clingempeel | |
| 5,925,283 A | 7/1999 | Taniuchi et al. | |
| 6,001,507 A | 12/1999 | Ono et al. | |
| 6,013,393 A | 1/2000 | Taniuchi et al. | |
| 6,096,234 A | 8/2000 | Nakanishi et al. | |
| 6,109,530 A | 8/2000 | Larson et al. | |
| 6,114,068 A | 9/2000 | Yamada et al. | |
| 6,148,503 A | 11/2000 | Delnick et al. | |
| 6,291,106 B1 | 9/2001 | Daido et al. | |
| 6,296,971 B1 | 10/2001 | Hara | |
| 6,315,918 B1 | 11/2001 | Mita et al. | |
| 6,406,817 B2 | 6/2002 | Wariishi et al. | |
| 6,413,675 B1 | 7/2002 | Harada et al. | |
| 6,451,480 B1 | 9/2002 | Gustafson et al. | |
| 6,465,134 B1 | 10/2002 | Shibuya et al. | |
| 6,503,831 B2 | 1/2003 | Speakman | |
| 6,509,123 B1 | 1/2003 | Shibuya et al. | |
| 6,534,214 B1 | 3/2003 | Nishijima et al. | |
| 6,596,440 B2 | 7/2003 | Gavelin et al. | |
| 6,617,074 B1 | 9/2003 | Watarai et al. | |
| 6,632,564 B1 | 10/2003 | Takahashi et al. | |
| 6,641,957 B1 | 11/2003 | Kawaguchi et al. | |
| 6,673,495 B1 | 1/2004 | Nishiuri et al. | |
| 6,713,389 B2 | 3/2004 | Speakman | |
| 2001/0038937 A1 | 11/2001 | Suzuki et al. | |
| 2002/0128034 A1 | 9/2002 | Stratmoen et al. | |
| 2002/0153424 A1 | 10/2002 | Li | |
| 2002/0160272 A1 | 10/2002 | Tanaka et al. | |
| 2002/0177039 A1 | 11/2002 | Lu et al. | |
| 2002/0187377 A1 | 12/2002 | Shinoda et al. | |
| 2003/0059681 A1 | 3/2003 | Noh | |
| 2003/0194607 A1 | 10/2003 | Huang | |
| 2003/0222755 A1 | 12/2003 | Kemper et al. | |
| 2004/0009403 A1 | 1/2004 | Kim et al. | |
| 2004/0018424 A1 | 1/2004 | Zhang et al. | |
| 2004/0043290 A1 | 3/2004 | Hatta | |
| 2004/0229118 A1 | 11/2004 | Wensley | |
| 2004/0229127 A1 | 11/2004 | Wensley | |
| 2005/0026042 A1 | 2/2005 | Vallee et al. | |
| 2005/0153209 A1 | 7/2005 | Vallee et al. | |

FOREIGN PATENT DOCUMENTS

| | | |
|---|---|---|
| EP | 0 821 368 | 1/1998 |
| EP | 0 823 744 | 2/1998 |
| EP | 0 825 619 | 2/1998 |
| JP | 05-285665 | 10/1993 |
| JP | 06-131422 | 5/1995 |
| JP | 07-320780 | 12/1995 |
| JP | 08-344237 | 12/1996 |
| JP | 10-129213 | 5/1998 |
| JP | 10-190609 | 7/1998 |
| WO | WO 1999/032929 | 7/1999 |
| WO | WO 2002/013304 | 2/2002 |
| WO | WO 2002/063073 | 8/2002 |

OTHER PUBLICATIONS

U.S. Appl. No. 11/061,751, filed Feb. 18, 2005, Nelson et al.

(Continued)

*Primary Examiner*—Laura Weiner
(74) *Attorney, Agent, or Firm*—Paul, Hastings, Janofsky & Walker LLP

(57) ABSTRACT

A polymer matrix electrolyte (PME) includes a polyimide, at least one salt and at least one solvent intermixed. The PME is generally homogeneous as evidenced by its high level of optically clarity. The PME is stable through harsh temperature and pressure conditions. A method of forming a PME includes the steps of dissolving a polyimide in at least one solvent, adding at least one salt to the polyimide and the solvent, wherein said polyimide, salt and solvent become intermixed to form the PME, the PME being substantially optically clear.

14 Claims, 24 Drawing Sheets

OTHER PUBLICATIONS

U.S. Appl. No. 11/115,193, filed Apr. 27, 2005, Wensley et al.
U.S. Appl. No. 11/127,299, filed May 12, 2005, Nelson et al.
U.S. Appl. No. 11/187,440, filed Jul. 22, 2005, Nelson et al.
U.S. Appl. No. 11/191,922, filed Jul. 29, 2005, Wensley et al.
Levine et al., "Electrochemical behavior of the polypyrrole/polyimide composite by potential step amperometry," Journal of Power Sources, vol. 124, pp. 355-359, (2003).
Meador et al., "Effects of Branching on Rod-Coil Block Polyimides as Membrane Materials for Lithium Polymer Batteries," Chem. Mater., vol. 15, No. 15, pp. 3018-3025, (2003).
Munnik et al., "Stopping power measurements of 0.5-10.5 MeV $^7$Li ions in polyimide, vyns, formvar, and polysulfone," Journal of Applied Physics, vol. 86, No. 7, 00. 3934-3938, (Oct. 1999).
Nie et al., "Novel Polymeric Aromatic Lithium Sulfonlimides as Salts for Polymer Electrolytes," Journal of Applied Polymer Science, vol. 85, pp. 1802-1805, (2002).
Tokuda et al., "Synthesis, Characterization, and Ion-Conductive Behavior in an Organic Solvent and in a Polyether of a Novel Lithium Salt of a Perfluorinated Polyimide Anion," Macromolecules, vol. 35, No. 4, pp. 1403-1411, (2002).
Viehbeck et al., "Electrochemical Properties of Polyimides and Related Imide Compounds," Journal of the Electrochemical Society, vol. 137, No. 5, pp. 1460-1466, (May 1990).

poly(PMDA+TMMDA)imide poly(PMDA/6FDA+TMMDA)imide poly(PMDA/6FDA+TMMDA)imide

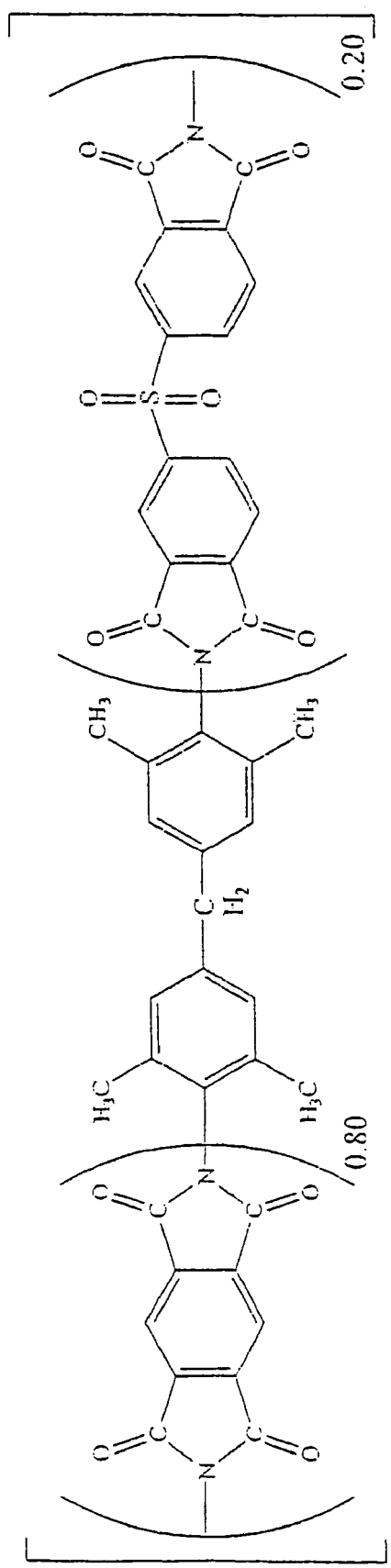
FIG. 1(d) poly(PMDA/PSDA+TMMDA)imide poly(BPDA+durene)imide

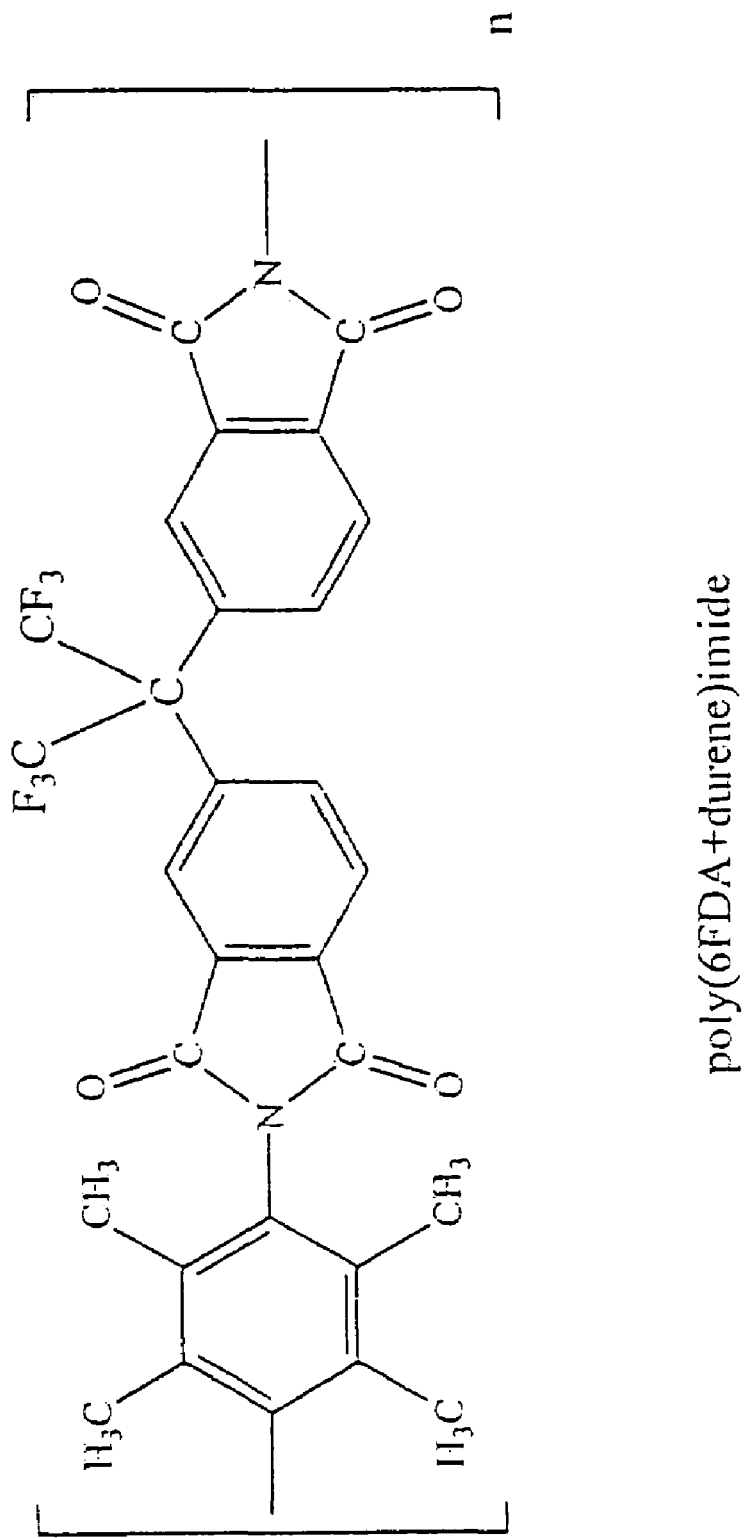
FIG. 1(f) poly(6FDA+durene)imide poly(PSDA+TMMDA)imide poly(6FDA+TMMDA)imide poly(BPDA + 4,4'-fluorilidenedianiline)

poly(PMDA+TMMDA/TMPDA)imide

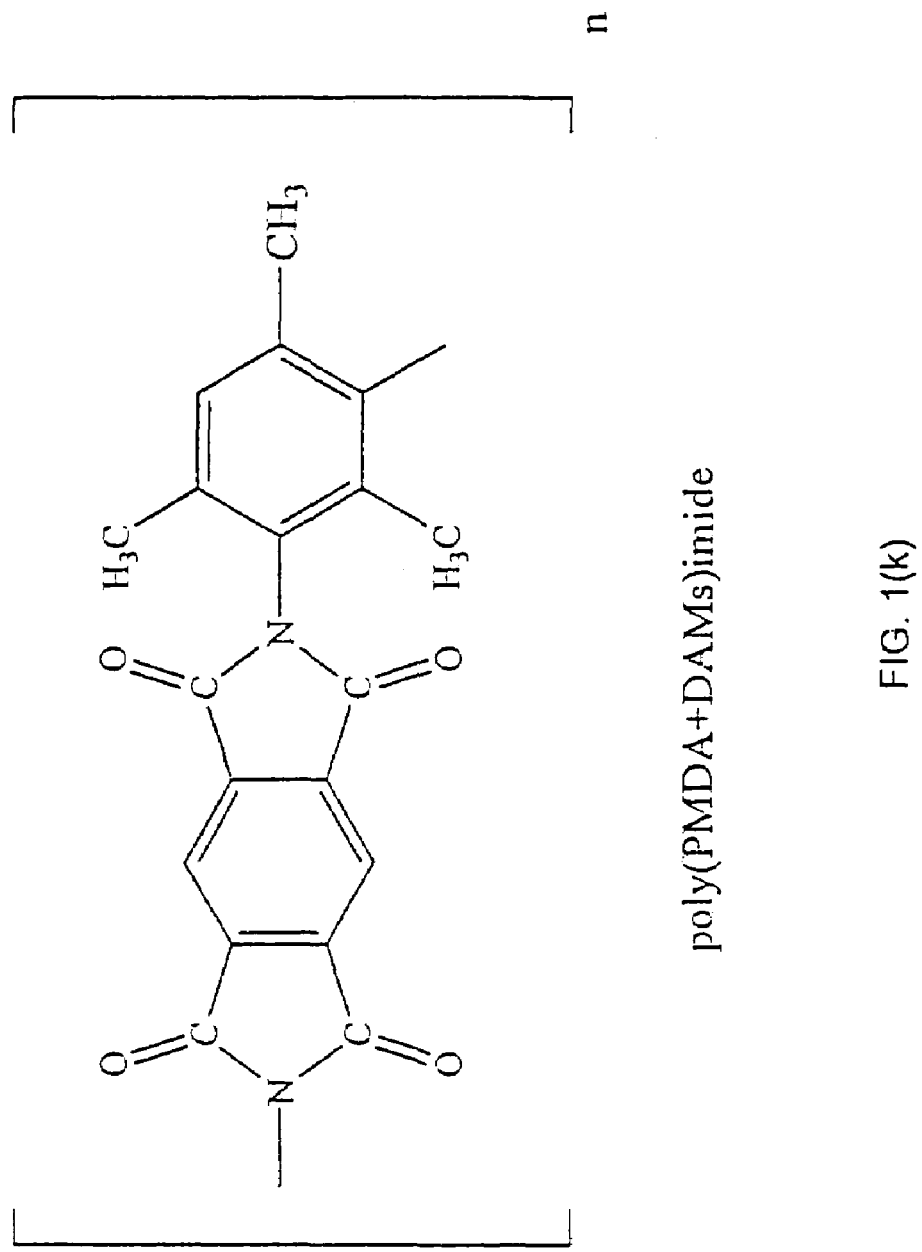
FIG. 1(k) poly(PMDA+DAMs)imide

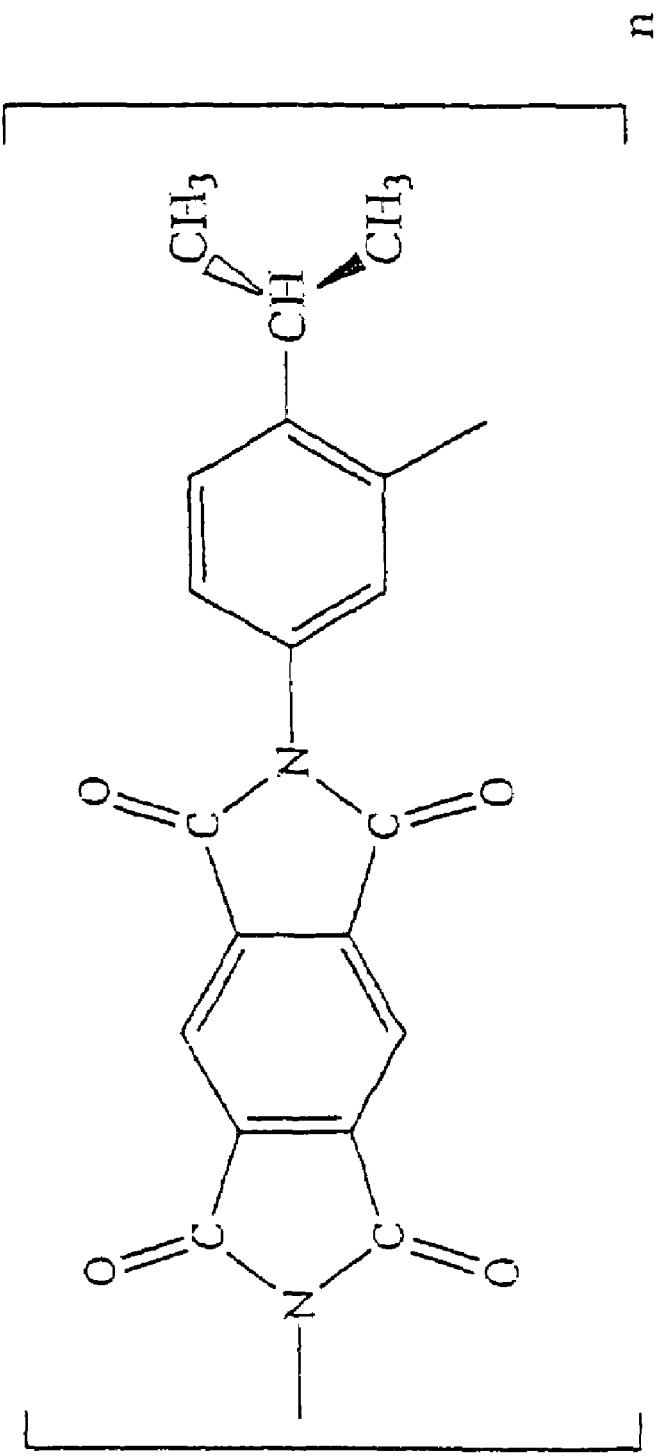
FIG. 1(f) poly(PMDA+4-isopropyl-m-phenylenediamine)imide poly(PMDA+TMMDA/DAMs)imide GPI-15 and LiTFSi with GBL at 20.5C

| Salt Conc. | Max S/cm | LiTFSi/GBL | GBL/PI | Film Composition | | |
|---|---|---|---|---|---|---|
| | | | | Wt % GBL | Wt % PI | Wt % salt |
| 1.0x | 1.8E-04 | 0.581 | 1.72 | 46.2 | 26.9 | 26.9 |
| 1.4x | 1.8E-04 | 0.875 | 1.60 | 40.0 | 25.0 | 35.0 |
| 1.8x | 2.5E-04 | 1.040 | 1.73 | 38.2 | 22.1 | 39.7 |
| 2.2x | 4.2E-04 | 1.128 | 1.95 | 37.9 | 19.4 | 42.7 |

| | if S/cm | LiTFSi/GBL | GBL/PI | Film Composition | | |
|---|---|---|---|---|---|---|
| | | | | Wt % GBL | Wt % PI | Wt % salt |
| 1.0x | 1.0E-04 | 0.952 | 1.05 | 34.4 | 32.8 | 32.8 |
| 1.4x | 1.0E-04 | 1.429 | 0.98 | 29.0 | 29.6 | 41.4 |
| 1.8x | 1.0E-04 | 1.800 | 1.00 | 26.3 | 26.3 | 47.4 |
| 2.2x | 1.0E-04 | 2.200 | 1.00 | 23.8 | 23.8 | 52.4 |

FIG. 2

Chem Abstracts numbers for the monomers of interest

| Monomer | CAS # |
|---|---|
| PMD | 89-32-7 |
| TMMDA | 4037-98-7 |
| DAMs | 3102-70-3 |
| 6FDA | 1107-00-2 |
| TEMDA | 13680-35-8 |
| TMPDA | 22657-64-3 |
| BPDA | 2421-28-5 |
| DSDA | 2540-99-0 |
| 4-isopropyl-m-phenylenediamine | 14235-45-1 |
| 3,6-diaminodurene | 3102-87-2 |
| 4,4'-(9-fluorenylidene)dianiline | 15499-84-0 |

FIG. 6

POLYIMIDE MATRIX ELECTROLYTE

CROSS REFERENCE TO RELATED APPLICATION

Not applicable.

STATEMENT AS TO FEDERALLY SPONSORED RESEARCH

Not applicable.

FIELD OF THE INVENTION

The invention generally relates to electrolytes, and more particularly to optically clear polyimide based electrolytes which are homogeneous mixtures of polyimide, salt and solvent.

BACKGROUND

Many performance parameters of batteries are associated with the electrolyte separator selected, and the interaction of the selected electrolyte with the cathode and anode materials used. All batteries require electrolytes to provide high ionic conductivity and electrochemical stability over a broad range of temperatures and potentials. Ionic conductivity is one of the most important properties of electrolytes. High ionic conductivity generally improves battery performance. Thus, significant research has focused on developing methods for increasing the ionic conductivity of electrolytes used in electrochemical cells.

The electrolyte used in lithium batteries can be a liquid or a polymer based electrolyte. Lithium batteries including liquid electrolytes have been on the market for several years. Lithium ion rechargeable batteries having liquid electrolytes are currently mass produced for applications such as notebook computers, camcorders and cellular telephones. However, lithium batteries having liquid electrolyte technology have several major drawbacks. These drawbacks relate to cost and safety and stem from use of a liquid electrolyte. The liquid electrolyte generally requires packaging in rigid hermetically sealed metal "cans" which can reduce energy density. In addition, for safety reasons, lithium ion rechargeable batteries and lithium-metal primary batteries having liquid electrolytes are designed to vent automatically when certain abuse conditions exist, such as a substantial increase in internal pressure which can be caused by internal or external overheating. If the cell is not vented under extreme pressure, it can explode because the liquid electrolyte used in liquid Li cells is extremely flammable.

Lithium batteries having solid polymer electrolytes represent an evolving alternative to lithium batteries having liquid electrolytes. Solid polymer electrodes are generally gel type electrolytes which trap solvent and salt in pores of the polymer to provide a medium for ionic conduction. Typical polymer electrolytes comprise polyethylene oxide (PEO), polyether based polymers and other polymers which are configured as gels, such as polyacrylonitrile (PAN), polymethylmethacrylate (PMMA) and polyvinylidine fluoride (PVDF). The polymer electrolyte generally functions as a separator, being interposed between the cathode and anode films of the battery.

Because its electrolyte is generally a non-volatile material which does not generally under normal operating conditions leak, a lithium battery having a polymer electrolyte is intrinsically safer than a lithium battery having a liquid electrolyte. Moreover, polymer electrolytes eliminate the need for venting and package pressure control which are generally required for operation of lithium batteries having liquid electrolytes. Thus, polymer electrolytes make it possible to use a soft outer case such as a metal plastic laminate bag, resulting in improvement in weight and thickness, when compared to liquid electrolyte can-type Li batteries.

Many performance parameters of lithium batteries are associated with the electrolyte choice, and the interaction of the selected electrolyte with the cathode and anode materials used. High electrolyte ionic conductivity generally results in improved battery performance. The ionic conductivity of gel polymer electrolytes have been reported to be as high as approximately $10^{-4}$ S/cm at 25° C. However, it is desirable for the ionic conductivity of the polymer electrolyte to reach even higher values for some battery applications. In addition, it would also be desirable to enhance the electrochemical stability of the polymer electrolyte towards anode and cathode materials to improve battery reliability, as well as storage and cycling characteristics.

While gel polymer electrolytes represent an improvement over liquid electrolytes in terms of safety and manufacturability, safety issues remain because gel polymers trap solvent on its pores and under extreme conditions (e.g. heat and/or pressure) can still escape and cause injury. In addition, gel polymer electrolytes cannot generally operate over a broad temperature range because the gel generally freezes at low temperatures and reacts with other battery components or melts at elevated temperatures. Moreover, electrode instability and resulting poor cycling characteristics, particularly for metallic lithium containing anodes, limits possible applications for such batteries formed with gel polymer electrolytes.

Alternative polymer materials have been actively investigated to provide improved characteristics over available polymer choices. For example, U.S. Pat. No. 5,888,672 to Gustafson et al. ('672 patent) discloses a polyimide electrolyte and a battery formed from the same which operates at room temperature and over a broad range of temperatures. The polyimides disclosed are soluble in several solvents and are substantially amorphous. When mixed with a lithium salt, the resulting polyimide based electrolytes provide surprisingly high ionic conductivity. The electrolytes disclosed in '672 are all optically opaque which evidences some phase separation of the various components comprising the electrolyte. Although the electrolytes disclosed by the '672 patent can be used to form a polymer electrolyte which provides an improved operating temperature range, ease of manufacture, and improved safety over conventional gel polymer electrolytes, it would be helpful if the electrolyte stability and ionic conductivity could be improved.

SUMMARY OF THE INVENTION

A polymer matrix electrolyte (PME) includes a polyimide, at least one lithium salt in a concentration of at least 0.5 moles of lithium per mole of imide ring provided by the polyimide, and at least one solvent, all intermixed. The PME is generally homogeneous as evidenced by its high level of optical clarity. As used herein, when the PME is referred to as being "substantially optically clear", it refers to a PME being at least 90% clear, preferably at least 95%, and most preferably being at least 99% clear as measured by a standard turbidity measurement, transmitting through a normalized 1 mil film using 540 nm light.

The lithium salt can be selected from the group consisting of LiCl, LiBr, LiI, LiBOB, LiClO$_4$, LiBF$_4$, LiAsF$_6$, LiPF$_6$, LiCF$_3$SO$_3$, LiN(CF$_3$SO$_2$)$_2$ and lithium bis(trifluorosulfonyl) imide (LiTFSi). The concentration of lithium salt can be between 0.5 to 2.0 moles Li per mole of imide ring provided by the polyimide, or 1.2 to 2.0 moles Li per mole of imide ring provided by the polyimide.

A repeat unit weight per imide ring of the polyimide can be no more than 350, no more than 300, or no more than 250. The polyimide can be soluble at 25° C. in at least one solvent selected from the group consisting of N-methylpyrrolidinone (NMP), dimethylacetamide (DMAc) and dimethylformamide (DMF).

The ionic conductivity of the PME at 25° C. can be at least 1×10$^{-4}$ S/cm, and is preferably at least 3×10$^{-4}$ S/cm. The PME provides at least one absorption between about 1630 and 1690 cm$^{-1}$, even though neither the salt or polyimide provide any absorption peaks in this range.

A method of forming a polymer matrix electrolyte (PME) includes the steps of dissolving a polyimide in at least one solvent, adding at least one lithium salt in a concentration of at least 0.5 moles of lithium per mole of imide ring provided by the polyimide to the polyimide and the solvent, wherein the polyimide, salt and solvent become intermixed. The PME is substantially optically clear which evidences the lack of phase separation of its respective components.

BRIEF DESCRIPTION OF THE DRAWINGS

A fuller understanding of the present invention and the features and benefits thereof will be accomplished upon review of the following detailed description together with the accompanying drawings, in which:

FIG. 2 is a table illustrating ionic conductivity and the resulting film composition at 20.5° C. for a PME comprising the polyimide shown in FIG. 1 (m), LiTFSi salt (2.2×) and the solvent gamma butyrolactone (GBL), according to an embodiment of the invention.

FIG. 6 is a table which includes dianhydrides and aromatic diamines that can be used for making polyimides presented herein.

DETAILED DESCRIPTION

Figure 1A:
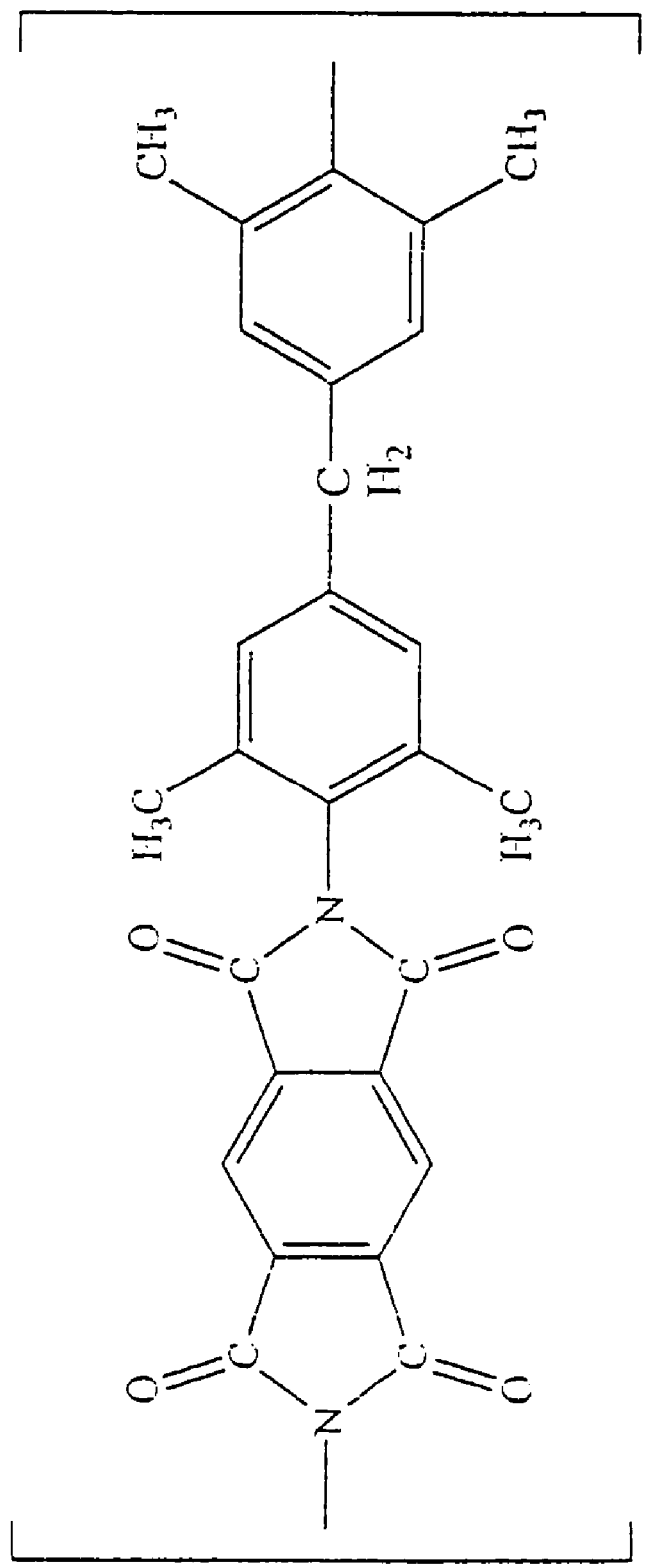
FIG. 1 (a)–(m) illustrates the repeat unit structure for several suitable polyimides, according to an embodiment of the invention.

The invention describes a substantially optically clear electrolyte separator matrix which includes a polyimide, at least one salt and at least one solvent. The solvent is generally a low molecular weight, low viscosity liquid which swells the polyimide at low concentration and at a sufficiently high concentration allows the polyimide, salt and the solvent to become homogeneously mixed. As used herein, the substantially optically clear electrolyte matrix is referred to as a "polymer matrix electrolyte" or PME. The PME can be used for batteries, supercapacitors and other applications.

Regarding batteries, the PME can be used for both lithium ion and lithium metal containing batteries. Unlike gel polymer electrolytes, once the PME is formed, there is generally no free solvent or identifiable pores. For example, using a SEM at a 50 Å resolution, no pores in the PME can be identified. Instead, the solvent is integrated with the polymer and the lithium salt in a homogeneous and substantially optically clear matrix. In addition, unlike conventional gel polymers where the polymer only provides mechanical support, the polymer, salt and solvent comprising the PME all participate in ionic conduction.

The PME provides high current carrying capacity, cycling stability and maintains this performance level across a wide temperature range, such as at least from −40° C. to 100° C. For example, batteries comprising the PME can withstand high temperatures and pressures with small changes in open circuit voltage and capacity, such as the conditions generally used in the hot lamination processes used in credit card manufacturing, or even a typical injection molding process.

As used herein, the phrase "substantially optically clear" refers to a material being at least 90% clear, preferably at least 95%, and most preferably being at least 99% clear as measured by a standard turbidity measurement, transmitting through a normalized 1 mil film using 540 nm light. Optical clarity data for PMEs formed according to the invention under these measurement conditions are shown in Example 1 which demonstrate at least 99% optical transmission through a 1 mil (normalized) PME film. The high level of optical clarity of the PME evidences the homogeneity of the PME comprising its respective components (polymer, salt and the solvent) as any significant phase separation would substantially reduce the optical clarity of the film.

The interaction between the salt and polymers according to the invention produces a generally highly optically clear film. Solvent addition does not generally change the optical clarity of the film. As the salt concentration is increased, a point will be reached where salt begins to form a separate phase. At that point, the PME film will begin losing its optical clarity.

The PME is generally based on one or more polyimides, which unlike other polymer-based electrolytes, participate in ionic conductivity through the presence of imide rings and other polar groups. Other polymer types which include highly polar groups having functional groups that can complex with lithium salts and participate in ionic conduction include polybenzimidazoles and polyamide-imides. Accordingly, these polymer types may also include species useful in forming a PME.

Polyimides are reaction products of a condensation reaction between diamines and dianhydrides to initially form a poly (amic-acid) intermediate. Either or both the diamine and dianhydride reagent can be mixture of diamine or dianhydride species. The poly amic-acid intermediate is then converted to a fully imidized polyimide.

The properties of the resulting polyimide formed depend on the selection of the particular diamines and dianhydride monomers. Polyimides are generally known to provide high thermal stability, chemical resistance and high glass transition temperatures, such as 200° C. to more than 400° C.

The current invention has identified polyimides distinct from those disclosed in the '672 patent and has found the addition of solvent to some of these distinct polyimides can result in the formation of a PME. Some of the polyimides identified herein provide represent newly synthesized polymers. Unlike the polymers disclosed in '672, the polymers disclosed herein form a substantially homogeneous matrix material (PME) when combined with an appropriate concentration of salt and the solvent. The homogeneity is evidenced by the high level of optical clarity provided. In contrast, the electrolytes disclosed in '672 are non-homogeneous mixture, as evidenced by their opaqueness which is indicative of phase separation of the respective components.

The Inventors have identified and synthesized improved polyimides for use in forming PMEs by qualitatively relating certain polymer parameters to ionic conductivity. Imide ring density is believed to explain why polyimide films, when loaded with lithium salt, show significant ionic conductivity, even in the absence of solvent. Repeat unit weight per imide ring is one measure of imide ring density and is calculated by dividing the molecular weight of the entire repeat unit of the respective polyimides by the number of imide rings within the respective repeat units.

Imide rings may provide the equivalent of a high dielectric-constant to materials because of the high electron density provided by the rings. Accordingly, it is believed that the interaction between the imide rings and the lithium ion is a factor in determining the ionic conductivity of a PME. Thus, improved polyimides for use as PMEs can be generally selected for further consideration by first calculating the number of imide rings (and to a lesser degree other highly polar groups, such as sulfone, carbonyl and cyanide) per molecular repeat unit in a given polyimide. The more imide ring function present per unit weight, the higher the average dielectric strength equivalence of the polymer. Higher equivalent dielectric strength is believed to generally lead to improved salt interaction, which can improve the ionic conductivity of the PME.

Alternatively, a quantity roughly inverse to imide ring density referred to as repeat unit weight per imide ring can be calculated to also compare the relative concentration of imide rings in polyimides. As the repeat weight per imide ring decreases, imide rings become an increasingly greater contributor to the repeat unit as a whole. As a result, as the repeat weight per imide ring decreases, the equivalent dielectric constant and ionic conductivity of the polyimide generally increase.

Polyimides which provide high helium permeability may generally produce higher ionic conductivity and thus form better PMEs. At 25° C., the measured He permeability of most polyimides according to the invention has been found to be at least 20 barrers. The He permeability can be at least 25, 30, 35, 40, 45, 50, 55, 60, 65, 70, 75 or 80 barrers, or more.

Helium permeability may be measured in the following suggested manner. The gas permeability (GP) of a gas component through a given film having a thickness (I) and area (A) can be determined by applying a pressure (p) across the film which is equal to the upstream pressure minus the downstream pressure of the gas component and measuring the resulting steady state rate of gas flow (f) permeating through the film at STP.

$$GP = (f\, l)/(A\, p)$$

Preferred units for GP is $(cm^2)(sec)^{-1}(cmHg)$, where 1 barrer is defined as the GP multiplied by $10^{10}$.

It is believed that the maximum ionic conductivity of the PME generally occurs when the polyimide/salt/solvent combination creates a completely homogenous, clear matrix. Any phase separation is expected to reduce the ionic conductivity values because phase separation would increase the tortuosity within the PME.

The maximum electrolyte conductivity of the PME at a given temperature generally occurs when the polyimide/salt/solvent matrix has a ratio within a specified range. The optimum salt concentration is generally in the range of 0.5 to 2.0 moles Li per mole of imide ring for a polyimide. Too little salt generally does not provide a sufficient number of ions to contribute to the charge transfer. Too much salt generally leads to phase instability and possible precipitation of the polyimide and resulting loss of homogeneity which can be verified by a loss in optical clarity.

The solvent is believed to play the role of a swelling agent for the polymer to move the backbone chains slightly apart and therefore enables greater ionic diffusion coefficients. The solvent also acts as a salvation carrier for the ions. Typically the solvent is chosen to also be stable within the limitations of the type of battery chosen. For example, for a lithium ion type battery the solvent must be stable up to the reduction potential of lithium metal. The amount of solvent can be optimized depending upon the either the conductivity desired or the softening point of the matrix at some required temperature. Solvents can be selected from a group of solvents including gamma butyrolactone (GBL), propylene carbonate, N-methylpyrrolidinone (NMP), tetrahydrothiophen-1,1-dioxide (TMS), polycarbonate (PC) and dimethyl formamide (DMF).

Figure 1B:
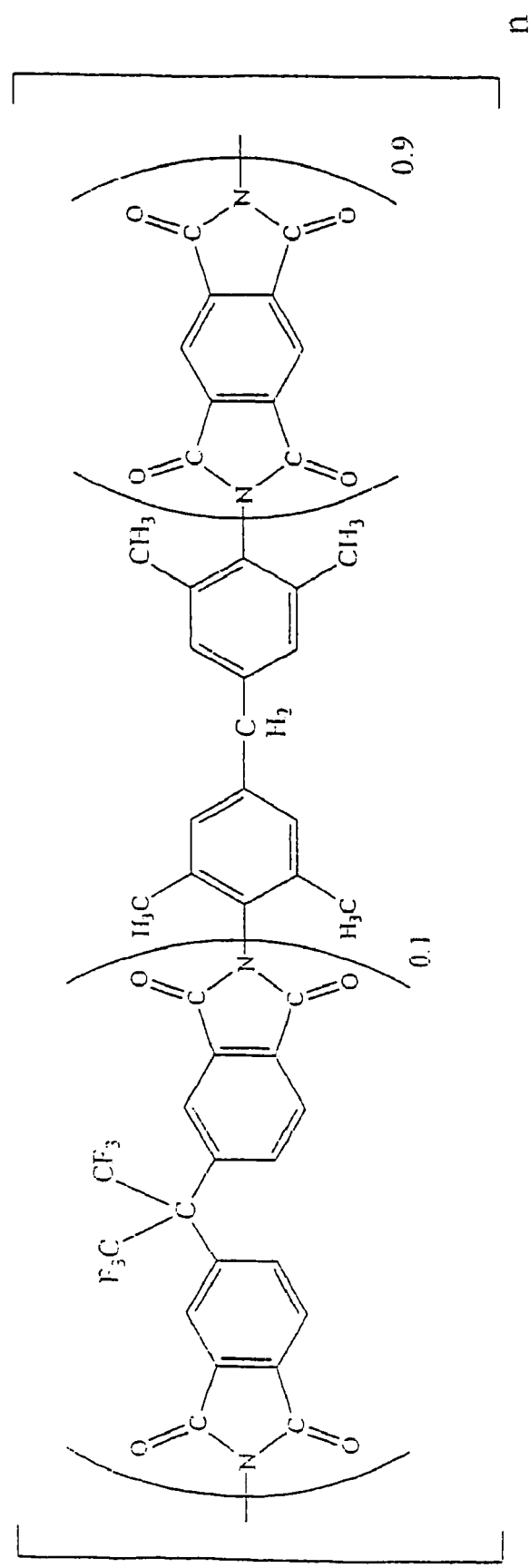
Figure 1C:
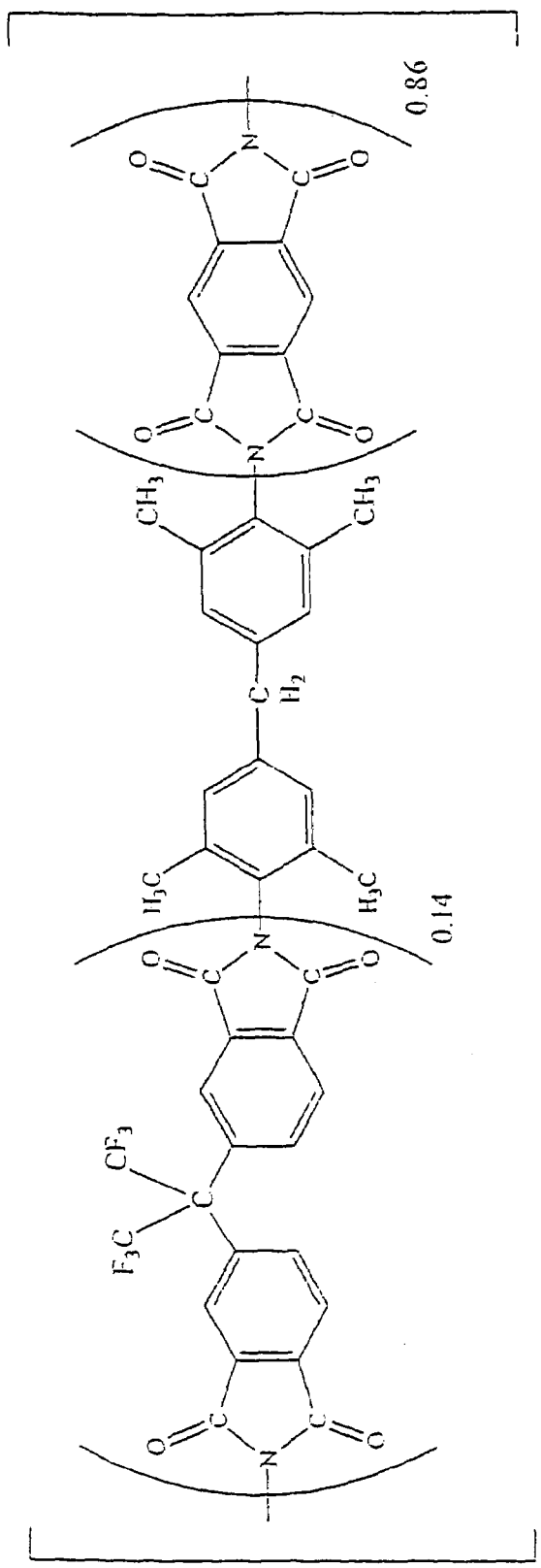
Figure 1E:
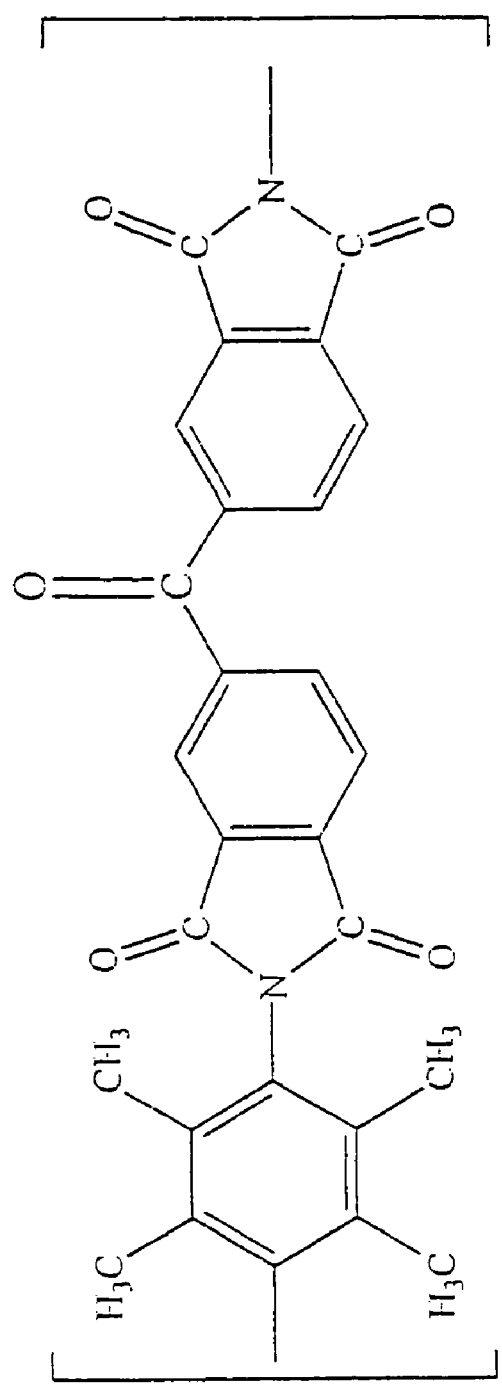
Figure 1G:
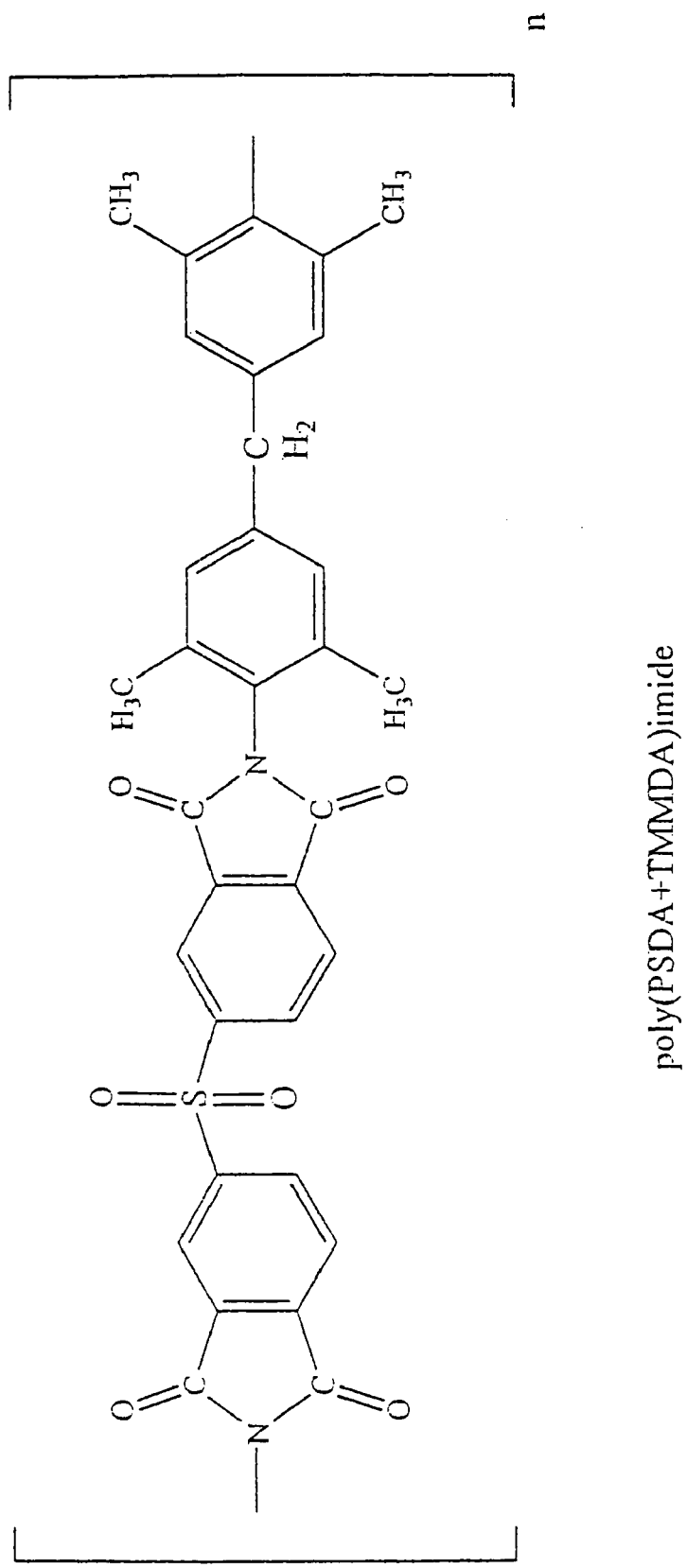
Figure 1:
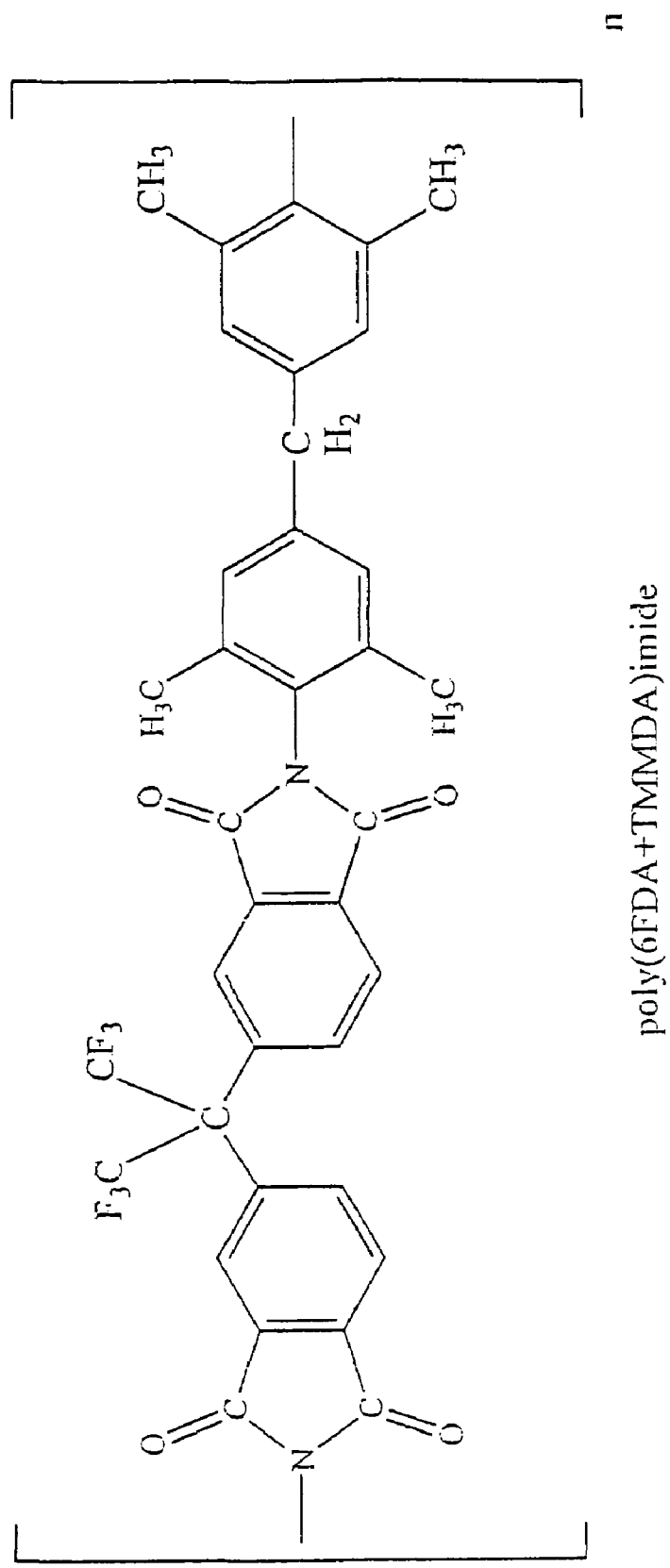

FIG. 1 (a)–(m) illustrates the repeat unit structure for several polyimides, according to an embodiment of the invention. The repeat unit for a polymer referred to as Polyimide A is shown in FIG. 1(a). This polyimide can be formed by reacting PMDA [89-32-7] with TMMDA [4037-98-7]. This high molecular weight polymer is soluble in NMP for a limited number of hours thus a lithium salt containing electrolyte could not be produced.

The repeat unit for the polymer referred herein to as Polyimide B is shown in FIG. 1(b). This polyimide can be formed by reacting 90 mole % PMDA [89-32-7], 10 mole % 6FDA [1107-00-2] dianhydrides and the diamine TMMDA [4037-98-7]. The polymer formed was soluble indefinitely in NMP at 20% by weight.

The repeat unit for the polymer referred herein to as Polyimide C is shown in FIG. 1(c). This polyimide can be formed by reacting 85.7 mole % PMDA [89-32-7], 14.3 mole % 6FDA [1107-00-2] and TMMDA [4037-98-7]. The polymer formed was soluble indefinitely in NMP at 20% by weight.

The repeat unit for the polymer referred herein to as Polyimide D is shown in FIG. 1(d). This polyimide can be formed by reacting 80 mole % PMDA [89-32-7], 20 mole % PSDA [2540-99-0] and TMMDA [4037-98-7]. The polymer formed was soluble indefinitely in NMP at 20% by weight.

The repeat unit for the polymer referred herein to as Polyimide E is shown in FIG. 1(e). This polyimide can be formed by reacting BPDA [2421-28-5] and 3,6 diaminodurene [3102-87-2]. The polymer formed was soluble indefinitely in NMP at 20% by weight.

The repeat unit for the polymer referred herein to as Polyimide F is shown in FIG. 1(f). This polyimide can be formed by reacting 6FDA [1107-00-2] and 3,6-diaminodurene [3102-87-2]. The polymer formed was soluble indefinitely in NMP at 20% by weight and is also soluble in acetone, GBL, DMAc, and DMF.

The repeat unit for the polymer referred herein to as Polyimide G is shown in FIG. 1(g). This polyimide can be formed by reacting PSDA [2540-99-0] and TMMDA [4037-98-7]. The polymer formed was soluble indefinitely in NMP at 20% by weight and is soluble in GBL.

The repeat unit for the polymer referred herein to as Polyimide H is shown in FIG. 1(h). This polyimide can be formed by reacting 6FDA [1107-00-2] and TMMDA [4037-98-7]. The polymer formed was soluble indefinitely in NMP at 20% by weight and is soluble in acetone, GBL, DMAc, and DMF.

Figure 1I:
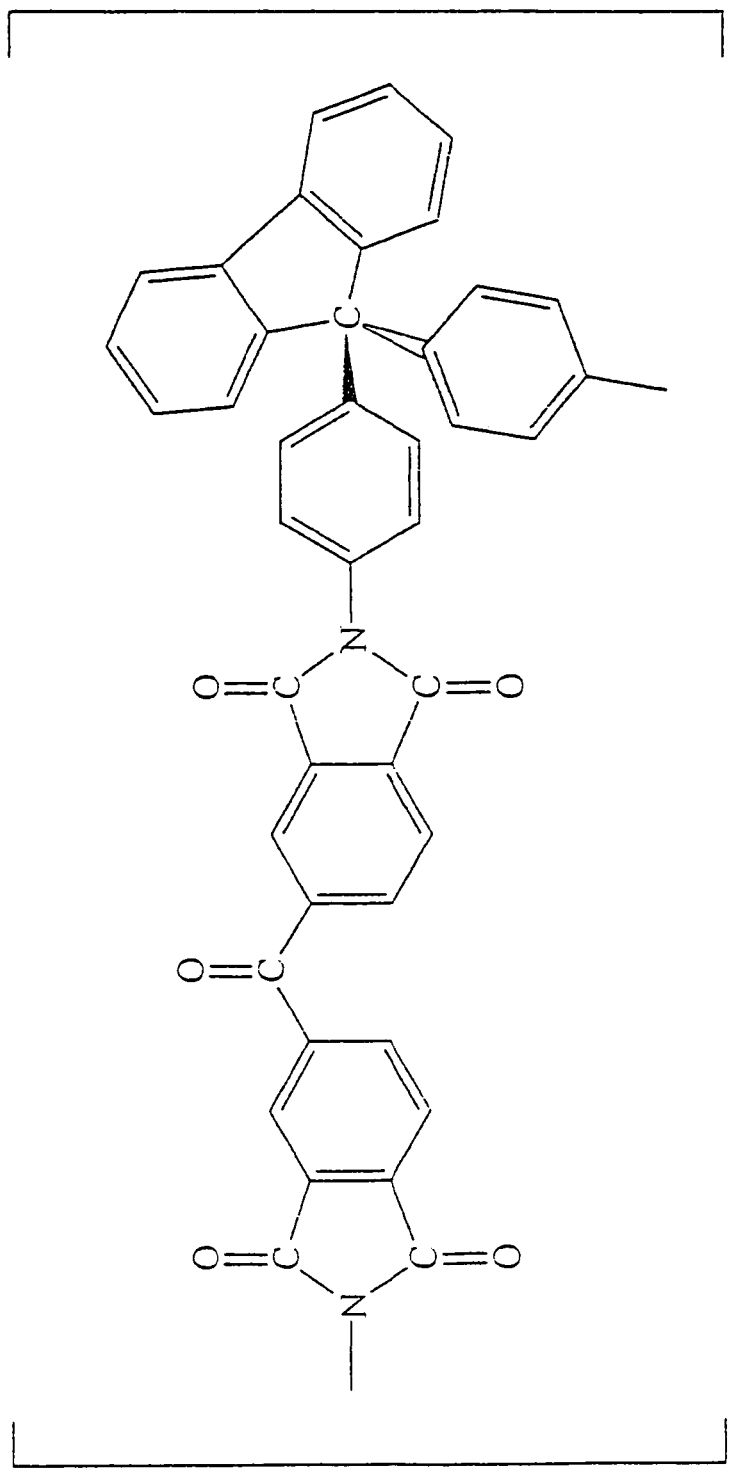

The repeat unit for the polymer referred herein to as Polyimide I is shown in FIG. 1(i). This polyimide can be formed by reacting BPDA [2421-28-5] and 4,4'-(9-fluorenylidene)dianiline [15499-84-0]. The polymer formed was soluble indefinitely in NMP at 20% by weight.

Figure 1J:
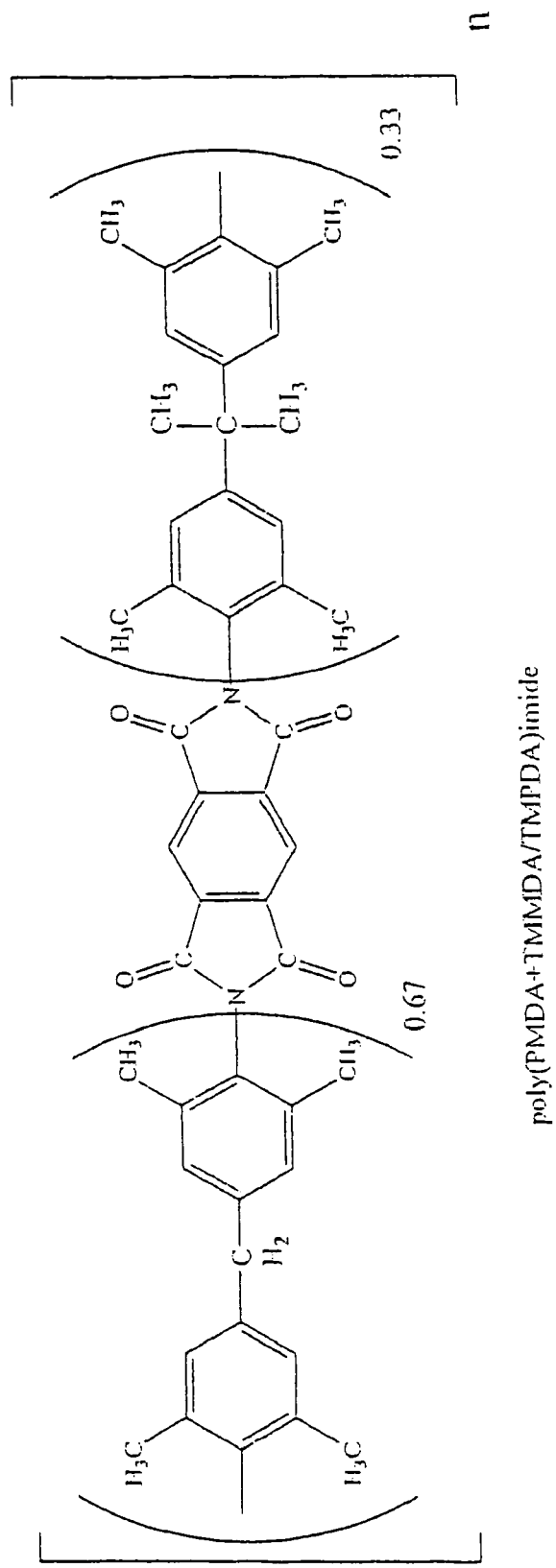

The repeat unit for the polymer referred herein to as Polyimide J is shown in FIG. 1(j). This polyimide can be formed by reacting PMDA [89-32-7], 33.3 mole % TMPDA [22657-64-3] and 66.7 mole % TMMDA [4037-98-7]. The polymer formed was soluble indefinitely in NMP at 20% by weight.

The repeat unit for the polymer referred herein to as Polyimide K is shown in FIG. 1(k). This polyimide can be formed by reacting PMDA [89-32-7] and DAMs [3102-70-3]. The polymer formed was soluble only for a short time in NMP.

The repeat unit for the polymer referred to herein as Polyimide L is shown in FIG. 1(l). This polyimide can be formed by reacting PMDA [89-32-7] and 4-isopropyl-m-phenylenediamine [14235-45-1]. The polymer formed was soluble indefinitely in NMP at 20% by weight.

Figure 1M:
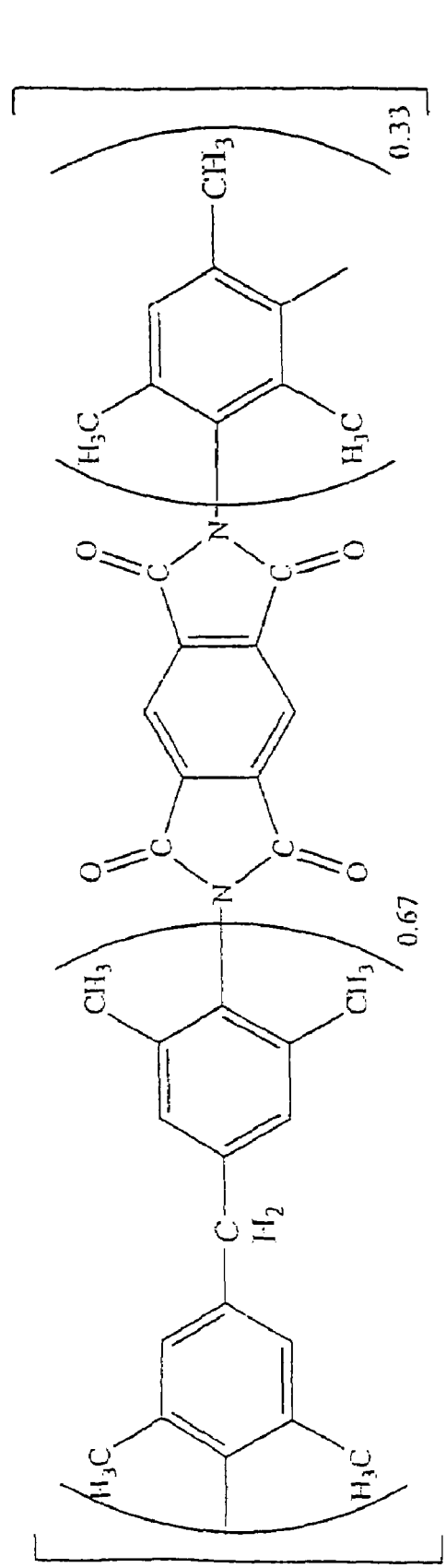
Figure 3A:
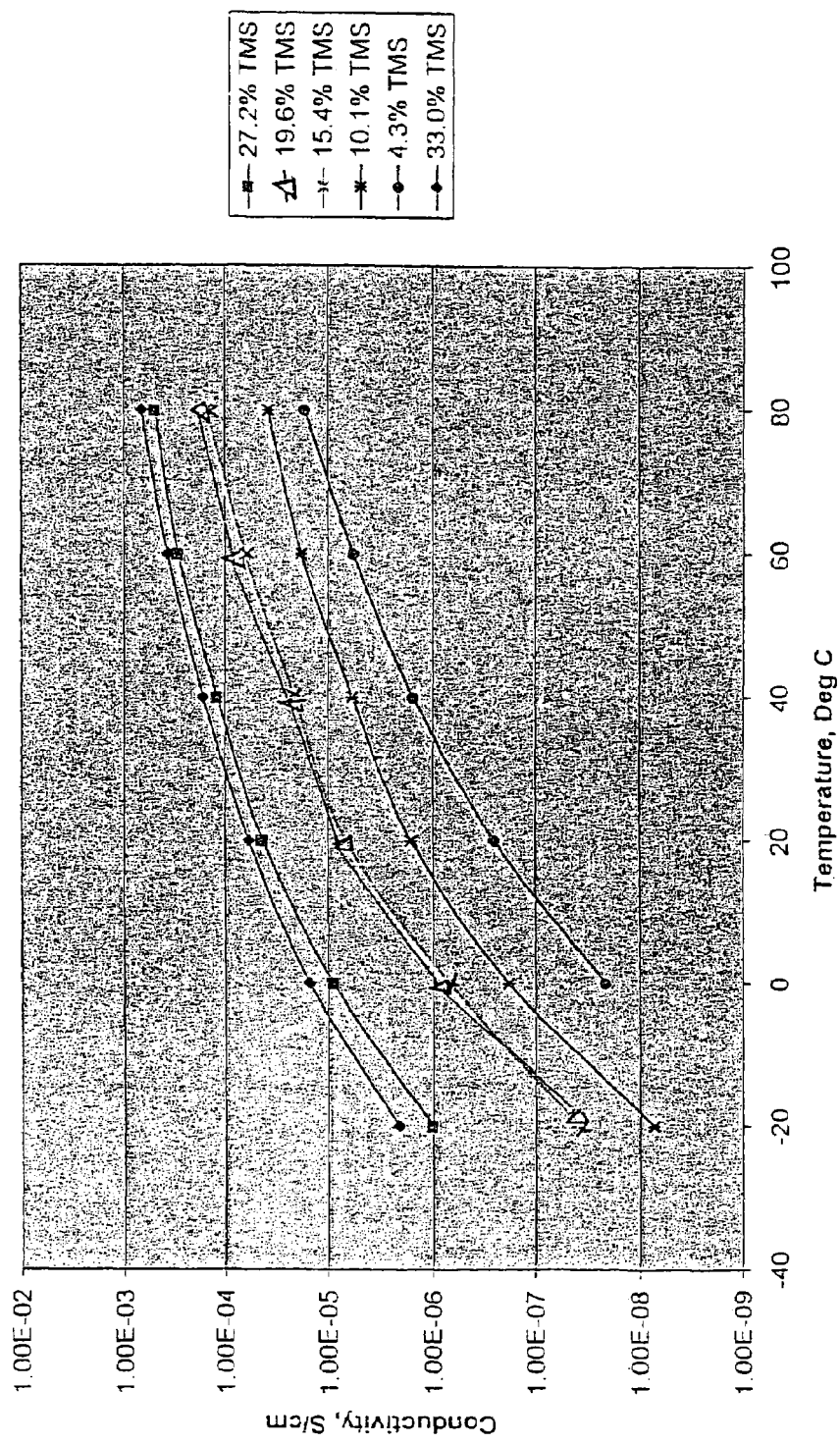
FIG. 3(a)–(d) are plots of the ionic conductivity of a PME comprising the polyimide shown in FIG. 1 (m) and the lithium salt LiTFSi (2.2×) as a function of solvent load and temperature for the solvents TMS, PC, GBL, and NMP, respectively.
Figure 3B:
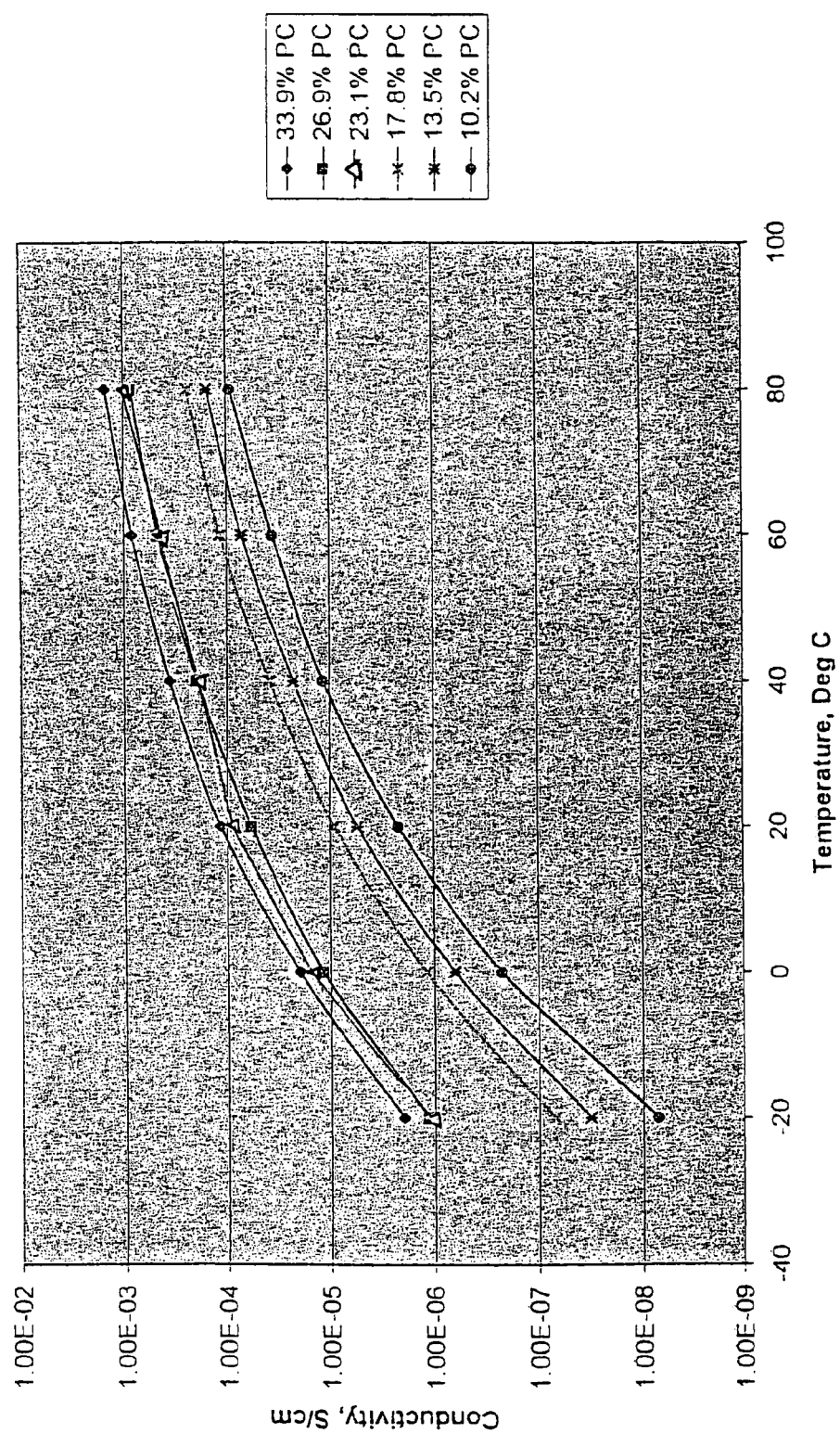
Figure 3C:
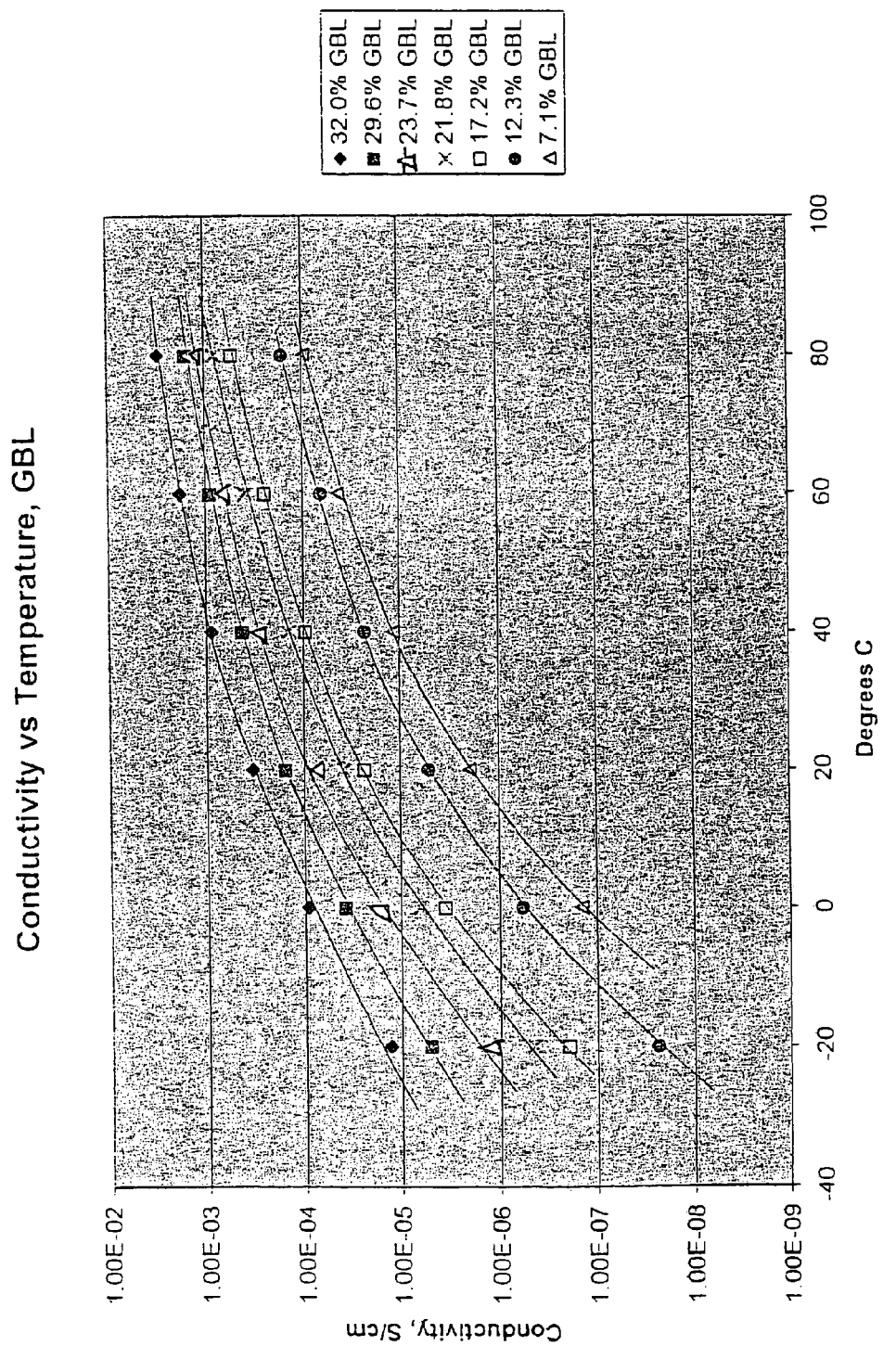
Figure 3D:
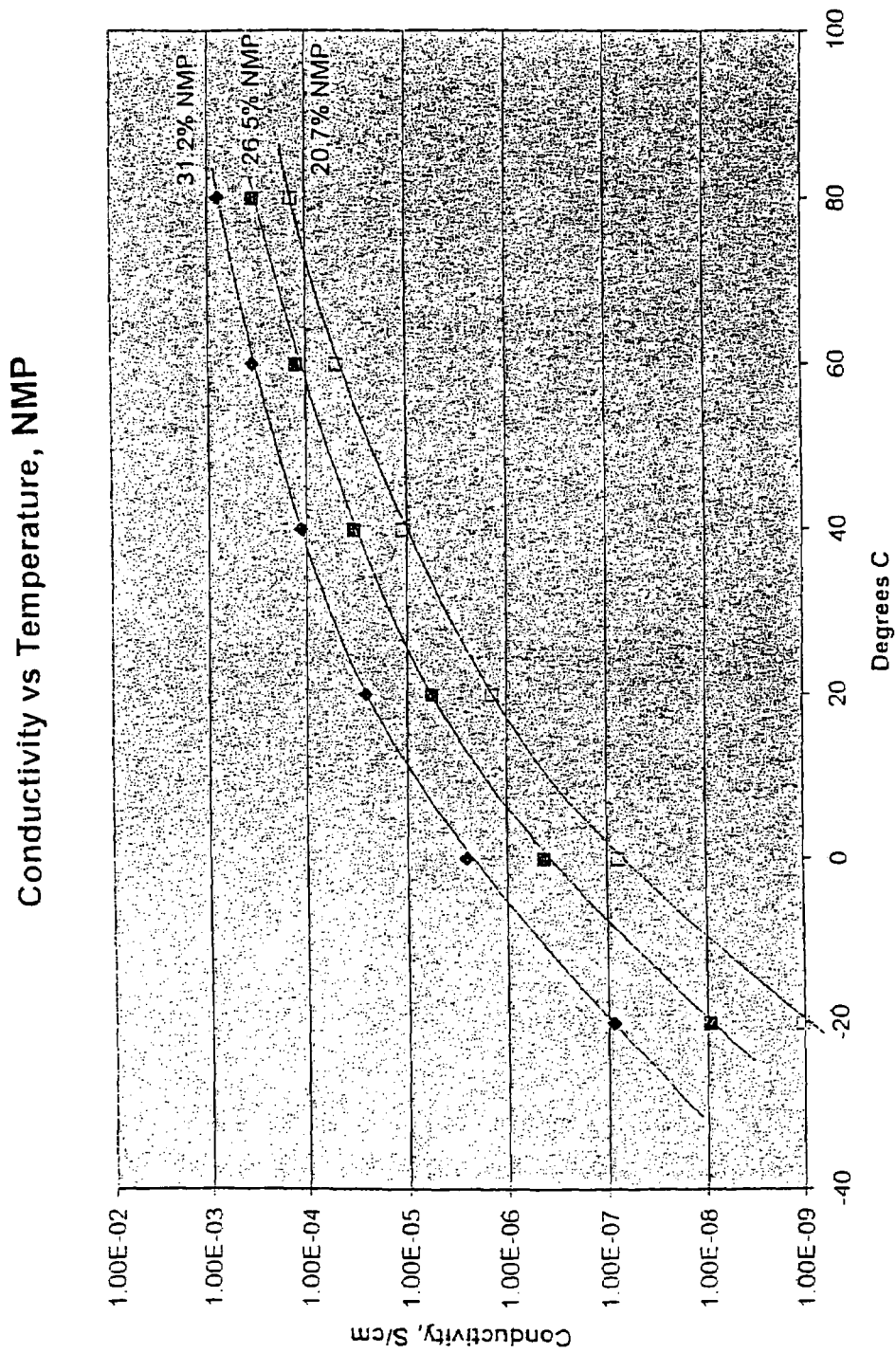

The repeat unit for the polymer referred herein to as Polyimide M is shown in FIG. 1(m). This polyimide can be formed by reacting PMDA [89-32-7], 33.3 mole % DAMs [3102-70-2] and 66.7 mole % TMMDA [4037-98-7]. The polymer formed was soluble indefinitely in NMP at 20% by weight.

Polyimide structures other than the exemplary structures shown in FIG. 1 can be good candidates for use in forming a PME matrix. Characteristics that a good PI should display, such as solubility in NMP (or other suitable solvent) to at least 20 wt % and a low repeat unit weight per imide ring can be a first criteria. However, the solubility of the PI itself or the solution stability when combined with a high concentration of a lithium salt applicable for battery applications is not easily predictable.

Behavior in solution can not generally be ascertained by simply looking at the polymer repeat unit structure. However, it can be determined from looking at the structure whether the polymer will possibly be crystalline, or whether it would have a high or low relative density in the solid phase. The polyimides are preferably non-crystalline, low-density repeat structures because they would be most likely to be very soluble. However, changing a single side group from a methyl to an ethyl can cause the properties of the PI to be changed from useful to of no use. A suggested meaningful screening procedure for alternative polyimides for battery applications is to take a polyimide that is known to have a good solubility in the solvent itself and then try to introduce the lithium salt at 0.5 mole Li per imide ring or more and see if (i) the resulting PI/salt/solvent solution is clear and homogenous for a few hours and (ii) the film cast from that solution remains substantially clear when most of the solvent (e.g. 95%) has been evaporated.

Polymers other than polyimides which provide a high relative local electron density (e.g. comparable to electron density adjacent to imide rings in polyimides) and the potential for charge separation due to multiple bond conjugation may form a polymer/salt complex and display characteristic absorption peaks based on the complex formed, provided they are soluble. Thus, absorption spectroscopy, such as FTIR can be used to identify these soluble non-polyimide polymers which show evidence of complex formation for use as a PME.

The PME includes at least one lithium salt. High PME ionic conductivities are generally achieved using a high salt content, such as from about 0.5 to 2.0 moles of Li per mole of imide ring for polyimide polymers along with some solvent. However, the concentration of lithium salt can be 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.3, 2.4 or 2.5 moles Li per mole of imide ring of the polyimide.

Salt concentrations are also described herein as a ratio of the weight of the salt to weight of the polymer (e.g. polyimide) excluding the salt. For example, a 1× concentration corresponds to an equal amount of salt and polymer, while a 2× salt concentration corresponds to twice the salt concentration as compared to the polymer concentration. The lithium salt can generally be any lithium salt known in the art. Preferably, lithium salts are chosen from LiCl, LiBr, LiI, Li(ClO$_4$), Li(BF$_6$), Li(PF$_6$), Li(AsF$_6$), Li(CH$_3$CO$_2$), Li(CF$_3$SO$_3$), Li(CF$_3$SO$_2$)$_2$N, Li(CF$_3$SO$_2$)$_3$, Li(CF$_{3\ CO2}$), Li(B(C$_6$H$_5$)$_4$, Li(SCN), and Li(NO$_3$), lithium bis(trifluorosulfonyl)imide (LiTFSi), LiBOB, and LiSCN. Preferably, the salt is either Li(PF$_6$) or LiTFSi.

FIG. 2 is a table illustrating the ionic conductivity at 20.5° C. and the corresponding film composition for a polyimide based PME comprising the polyimide shown in FIG. 1(m), LiTFSi salt (2.2×) and the solvent GBL, according to an embodiment of the invention. Room temperature ionic conductivity values for PME films were calculated from measured impedance using a complex impedance analyzer. Measurements using the impedance analyzer were made in the frequency range of 1 MHz to 0.1 Hz. A value for the resistance of the film, R, was taken as the intercept with the real axis of a Nyquist plot, or by an extrapolation of the high frequency portion of the response curve to the real axis. Measurements were also made on an LCR meter at a fixed frequency of 10 kHz where the resistance values were read directly. The ionic conductivity was calculated using the formula:

$$C(Seimens/centimeter) = t/R \times 10^{-4}$$

where t is film thickness in microns and R is the measured film resistance in Ohms.

As shown in FIG. 2, for the PMEs tested, the maximum ionic conductivity at 20.5° C. was about $1 \times 10^{-4}$ S/cm for a 1× salt concentration and $4 \times 10^{-4}$ S/cm for a 2.2× salt concentration, where the PME film comprised 37.9% GBL. The lower table portion shown in FIG. 2 shows the minimum solvent level required to provide a conductivity of $1 \times 10^{-4}$ S/cm for 1.0, 1.4, 1.8 and 2.2× salt concentrations.

The range of solvent in FIG. 2 is expressed as the solvent/PI ratio and runs from about 1 to about 2. The lower value is set be an ionic conductivity minimum for a given application, such as $1 \times 10^{-4}$ S/cm. The maximum conductivity was found to occur between a solvent/PI ratio of 1.5 to 2.0 depending upon the salt concentration.

The upper solvent/PI limit near 2 is controlled by the mechanical properties of the PME. At a high solvent/PI ratio the PME film becomes very soft and may not be usable over an extended temperature range as a separator for a battery.

Applied to lithium metal batteries, As a practical matter, the solvent is chosen to be moderately stable against lithium metal, high boiling (>150 C), capable of dissolving the chosen salt and swelling the PI, and finally it should have a low viscosity which promotes a high conductivity for the salt/solvent combination by itself, as well as for the PME.

To optimize the respective PI, salt and solvent concentrations, a suggested procedure is described below. In a first step, a PI species is selected which is soluble in an appropriate solvent, such as NMP or GBL. All the polyimides shown in FIG. 1 except the polyimide shown in FIG. 1(k), are soluble in NMP. In the second step, a desired lithium salt is selected and an initial concentration is selected, such as a mass ratio that gives one lithium ion per imide ring provided by the selected PI. The solvent concentration can then be varied from a solvent/PI ratio of about 0.8 to 2.0 while measuring the ionic conductivity for several solvent/PI data points in between. This can be repeated at salt concentrations both higher and lower. There are generally several combinations of PI/salt/solvent by mass that will give similar ionic conductivities, such as within a factor of two.

FIG. 3(a)–(d) are plots of the ionic conductivity of a PME comprising the polyimide shown in FIG. 1 (m) and the lithium salt LiTFSi (2.2×) as a function of solvent load and temperature for the solvents TMS, PC, GBL, and NMP, respectively. These curves generally do not show a clear conductivity maximum because the salt content was 2.2×, and as a result, the amount of solvent needed to provide the maximum ionic conductivity was large and generally impractical.

Figure 4:
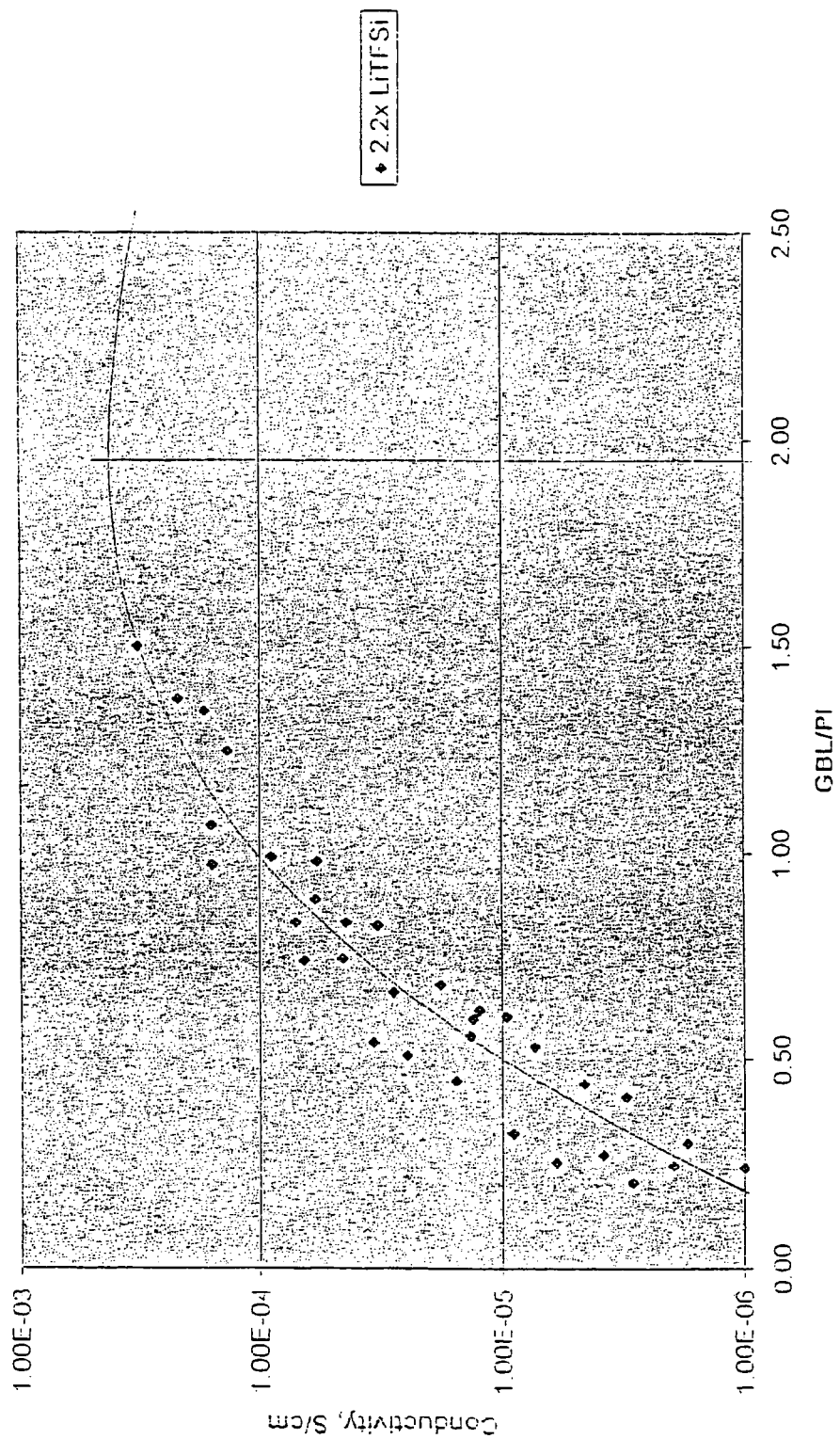
FIG. 4 is a plot of ionic conductivity of a PME comprising the polyimide shown in FIG. 1 (m) and the lithium salt LiTFSi (2.2×) as a function solvent/polyimide ratio at 20 C, where the solvent is GBL.

FIG. 4 is a plot of ionic conductivity of a PME comprising the polyimide shown in FIG. 1 (m) the lithium salt (LiTFSi; 2.2×) as a function solvent/polyimide ratio at 20° C., where the solvent is GBL. The ionic conductivity is seen to increase for increasing solvent to polyimide ratio up to about a GBL/polyimide ratio of about 1.5, where the ionic conductivity levels off at a value of about $7 \times 10^{-4}$ S/cm.

The ionic conductivity of PMEs based on polyimides is believed to be related to the degree the polyimides associate with alkali salts, particularly Li salts. This association is likely related to the formation of complexes between polar groups (e.g. imide and benzene) of the polyimide and the salt. Evidence for this association can be found by measuring the absorption frequencies displayed by the polymer when intermixed with the salt and comparing this data to the absorption frequencies displayed by the polyimide and the salt by themselves.

For a polyimide, characteristic absorption frequencies are believed to be related to the imide rings and benzene rings that comprise the polyimide backbone. These absorption peaks are at about 1778 $cm^{-1}$ and 1721 $cm^{-1}$ for the imide ring and 730 $cm^{-1}$ for the benzene ring. Common Li salts, including $LiPF_6$, LiBOB, LiI and LiTFSi do not show absorption at these frequencies, nor any absorption peaks between about 1630 and 1690 $cm^{-1}$. However, when certain polyimides which associate strongly with Li salts are combined with those salts, the resulting polyimide/salt film show the emergence of a very strong doublet with a first peak at about 1672 $cm^{-1}$ and a second peak at about 1640 $cm^{-1}$.

The first absorption frequency is present when a significant concentration of salt is in the polyimide film, such as at least 33 wt. %, but does not change significantly with increasing salt concentration. Thus, this peak can be used to indicate the interaction, provided a sufficient salt concentration is present. The magnitude of the second peak is nearly proportional to the ratio of the Li ion concentration to the imide rings and can be used to assess the extent of the interaction between the polyimide and the salt.

Figure 5A:
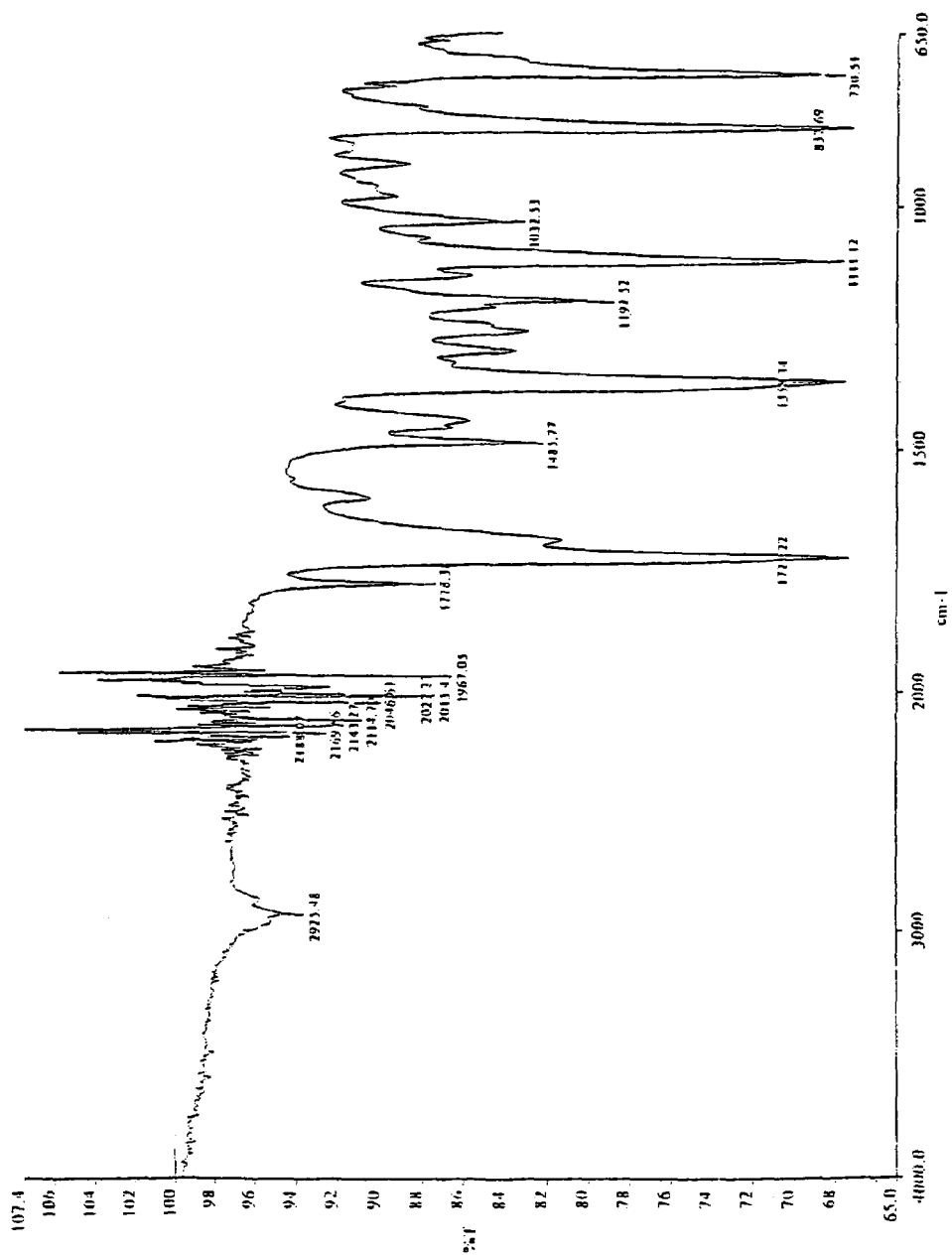
FIG. 5(a) is FTIR data for an exemplary polyimide without the addition of a Li salt or any solvent.

FIG. 5(a) is FTIR data for an exemplary polyimide, the polyimide shown in FIG. 1(c), without the addition of a Li salt or any solvent. Absorption peaks related to the imide rings are shown at about 1778 $cm^{-1}$ and 1721 $cm^{-1}$ and at 730 $cm^{-1}$ for the benzene ring. This polyimide does not show any detectable absorption peaks between about 1630 and 1690 $cm^{-1}$.

Figure 5B:
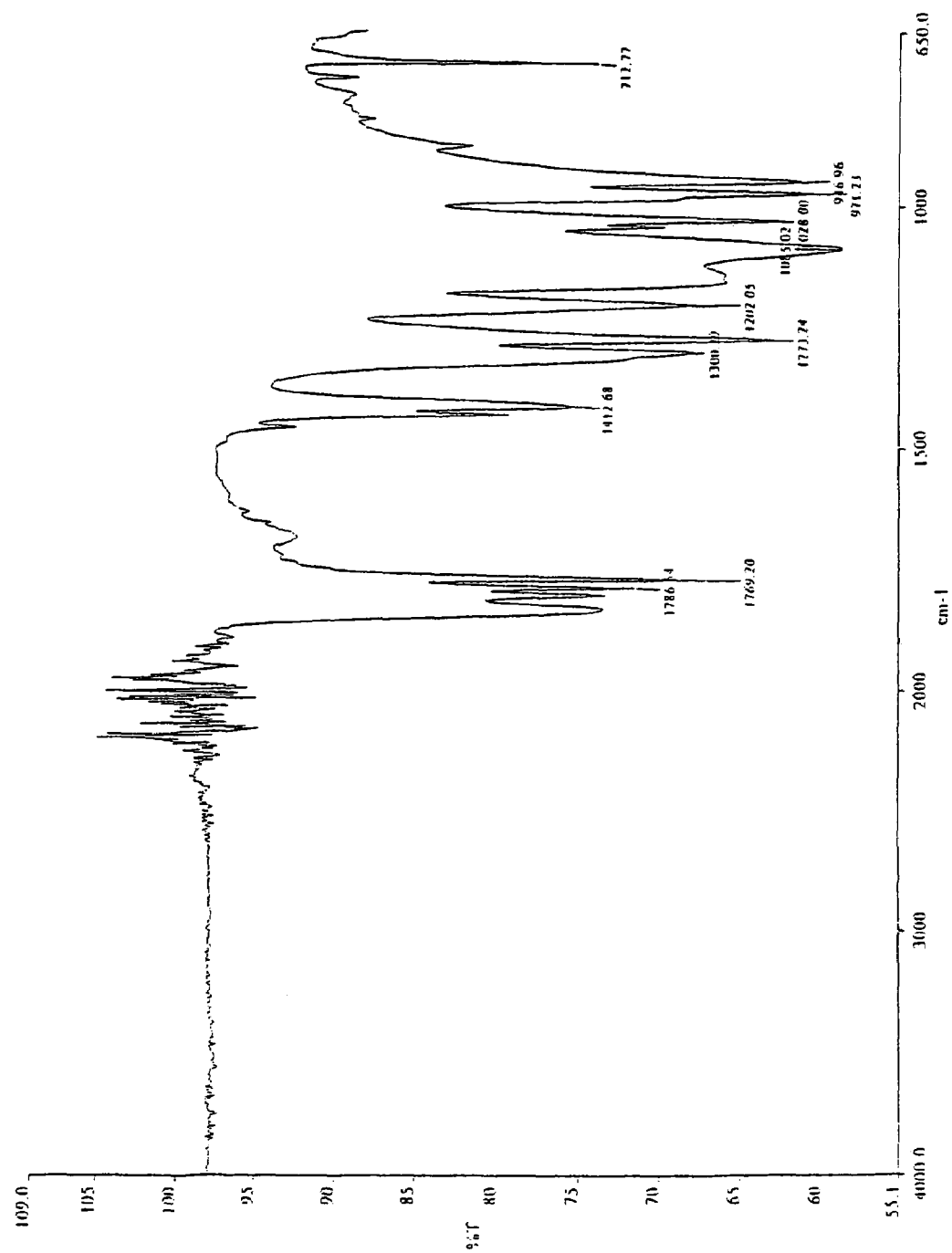
FIG. 5(b) is FTIR data for an exemplary Li salt.

Common Li salts, including $LiPF_6$, LiBOB, LiI and LiTFSi do not show absorption between 1630 and 1690 $cm^{-1}$. FIG. 5(b) shows an FTIR for LiBOB confirming the absence of infrared absorption between about 1630 and 1690 $cm^{-1}$.

Figure 5C:
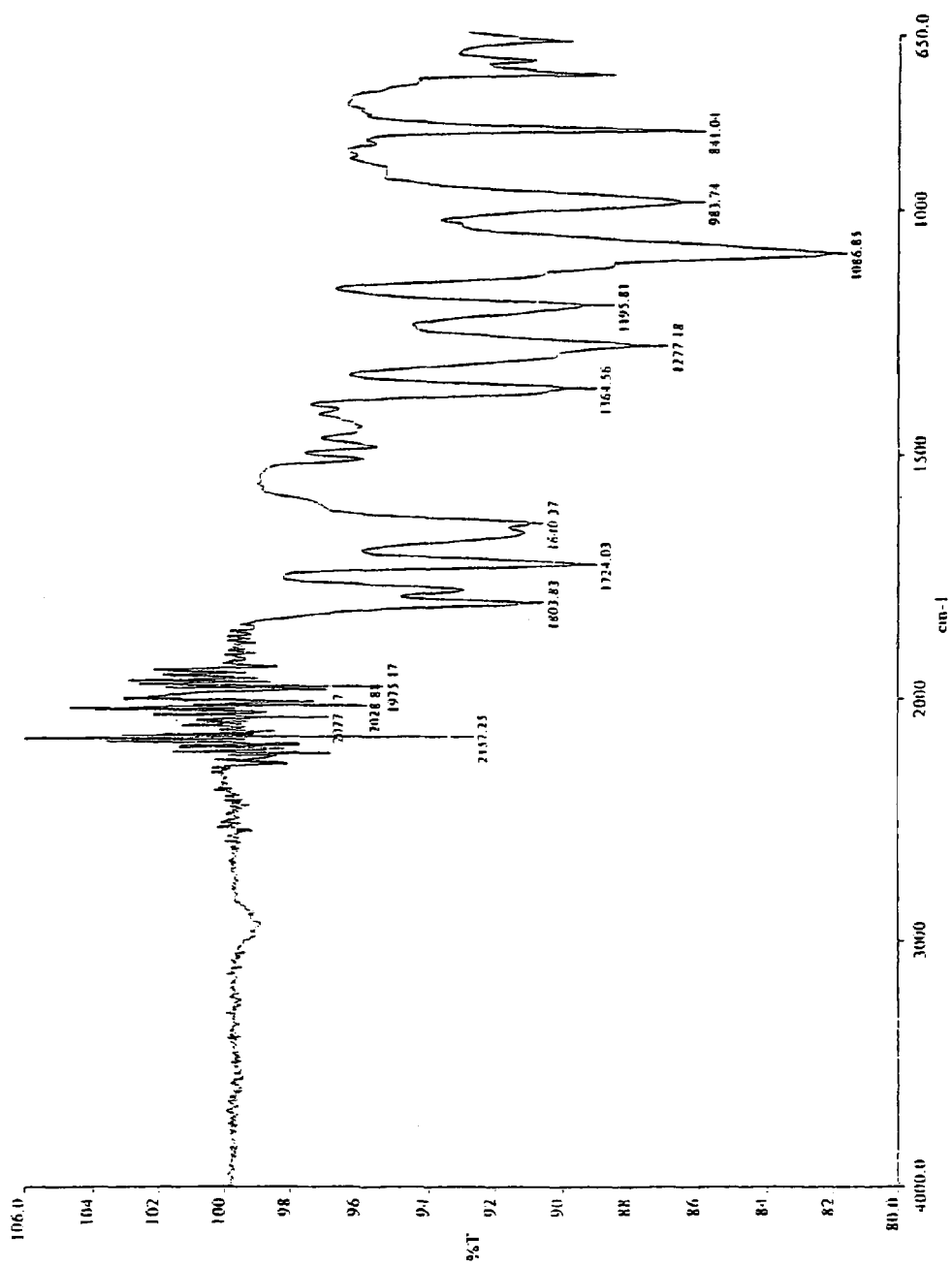
FIG. 5 (c) is FTIR data for the exemplary polyimide whose FTIR data is shown in of FIG. 5(a) intermixed with and the exemplary Li salt whose FTIR data is shown in FIG. 5(b) evidencing the emergence of a doublet absorption peak at between about 1630 cm$^{-1}$ and 1690 cm$^{-1}$.

FIG. 5(c) shows the FTIR the polyimide shown in FIG. 1(c) combined with LiBOB. The resulting polyimide electrolyte shows a very strong doublet with a first peak at about 1672 $cm^{-1}$ and a second peak at 1640 $cm^{-1}$.

Thus, FTIR measurements taken from exemplary PMEs according to the invention provide evidence that the lithium salt forms a complex with the imide rings of the polyimide. This is likely one of the main reasons why the polyimide/ lithium salt combination, in a dry film, has no apparent structure or crystallinity. The lack of crystallinity can be shown by a flat DCS trace. This evidence has also been found of an interaction between the lithium salt and the polyimide as the PME film is optically clear whether as a free standing film or as an overcoated film.

The PME can be used in a wide variety of applications. Both primary and rechargeable batteries formed from either lithium ion or lithium metal anodes can be formed using the invention. The PME may also be used for supercapacitors, and other applications.

Polyimides are generally prepared by reacting one or more diamines and one or more dianhydride monomers in a step-wise condensation reaction. Preferred diamines and dianhydrides are shown in FIG. 6.

The purity of the monomeric reactants has been found to be important. Aromatic diamines are known to be air sensitive. Thus, a purification process generally includes removing a portion of the oxidized diamine material. Following purification, aromatic diamines typically become white. However, absolutely pure diamines are difficult to achieve, and usually unnecessary. Recrystallization of the diamine from a mixture of alcohol and water has been found to be both effective and sufficient. The collected crystals are preferably dried under a vacuum because the water used for crystallization may not be easily removable at room temperature.

Dianhydrides are also preferably purified and can be purified using at least two methods. A preferred purification method is recrystallization from acetic anhydride. Acetic anhydride closes reactive anhydride rings. However, removal of acetic acid produced is sometimes difficult. Washing with ether or MTBE can be used to remove the residual acetic acid. The dianhydride crystals generally require drying in a vacuum oven. An alternate method is to quickly wash the crystals with dry ethanol to remove open anhydride rings and then to rapidly dry the washed powder in a vacuum oven. This method works for purifying BPDA if the incoming purity is at least approximately 96%.

The condensation reaction is performed to the poly (amicacid) stage. One mole of diamine is reacted with about 1.005 to 1.01 equivalents of dianhydride. Excess dianhydride is generally preferably used to ensure that the dianhydride reagent determines the end group of the reaction product, the dianhydride excess ensuring that polymer chains are terminated with anhydride end groups which are known to maximize stability of the polymer product. In addition, such an excess compensates for traces of water which can react with anhydride groups.

The solution is preferably about 15 to 20 weight % total in NMP solvent. The diamine is usually dissolved first, preferably under nitrogen, although this is not required for all diamines. The dianhydride is then added. A large scale reaction preferably adds the dianhydride in portions because there is some heat of reaction and it is desirable to keep the temperature below 40° C. For example, a small scale reaction of 50 grams could add the dianhydride all at once, provided there is good initial mixing.

The dianhydride generally dissolves much more slowly than the diamine. For a small-scale reaction, the best and simplest way to perform the reaction is to use a cylindrical jar with a polytetrafluoroethylene sealed cap. This jar can be shaken by hand in the beginning and then put on a rolling mill at slow speed to turn the jar smoothly. The reaction proceeds best at room temperature over a two to twelve hour period. Once the initial reaction is complete, as evidenced by a substantially constant solution color and viscosity, the solution is ready for imide ring closure.

The chemical reaction to form the polyimide from the poly (amic-acid) can be performed with 1.1 equivalents of acetic anhydride per imide ring and 1 equivalent of pyridine as a ring closure catalyst. Pyridine can be added and rolling preferably continued until mixed. The acetic anhydride can cause a portion of the amic-acid polymer to precipitate.

The polymer should be redissolved before heating. One needs to carefully heat the jar to more than 80° C. but less than 90° C. It is best to use an oven and occasionally remove the jar to shake. Heating is performed for 60 minutes at full heat or until the color changes are complete. The jar is put on a rolling mill to cool while turning. Once the solution returns to room temperature, a fully imidized polymer dissolved in NMP results. However, the solution generally also has some residual pyridine, acetic acid, and may include some acetic anhydride. The solution is expected to be stable for reasonable periods of time.

A preferred method for collecting the product from a small-scale reaction is to precipitate the polymer into methyl alcohol. This removes the solvent load and traces of monomers that did not react. It also can be used, in conjunction with the observed viscosity, to estimate the quality of the polymerization. A good, high molecular weight polyimide will precipitate cleanly into methyl alcohol with little or no cloudiness. The viscosity should be high (e.g. 8000 to 10,000 cp).

The precipitated polymer is preferably washed two or more times until the smell of pyridine is slight. The polymer can then be air dried for a few hours in a hood and then dried in a vacuum oven at 125° C. overnight. The volume of methyl alcohol is preferably about a gallon per 100 grams of polymer.

On a larger scale, water can be used to remove solvents or trace materials. However, water is expected to be a less efficient than methyl alcohol for this purpose. A final soak with methyl alcohol is preferably added before drying if water is used with large quantities of polymer.

EXAMPLES

The present invention is further illustrated by the following specific examples. The examples are provided for illustration only and are not to be construed as limiting the scope or content of the invention in any way.

Example 1

Optical Clarity of Commercially Available Polyimide/Salt/Solvent as Compared to Exemplary PMEs According to the Invention The purpose of this example is to demonstrate the homogenous nature of the PME formed from polyimides that have strong interactions with a lithium salt, as demonstrated by high levels of optical transmission of visible light. PME films were generated from polyimides shown in FIGS. 1(b), (c) and (m), while a Matrimid 5218p/salt/solvent was generated for comparison. The PMEs and Matrimid based film were cast upon a clear polyethylene terephthalate support film from NMP and dried for three hours in a vacuum oven at 120° C. The residual solvent content was approximately 4 wt %. All PME compositions and the Matrimid formulation were 32% polyimide, 64% LiTFSi salt, and the remainder being the small amount of solvent. All measurements were performed using 540 nm light at room temperature.

| Polyimide Type | Film Thickness (mils) | Absorbance | % Transmission for a 1 mil film |
|---|---|---|---|
| Matrimid 5218 | 0.70 | 1.903 | 0.2% |
| FIG. 1(b) PI | 1.68 | 0.005 | 99.3% |
| FIG. 1(c) PI | 0.66 | 0.000 | 100% |
| FIG. 1(m) PI | 0.87 | 0.000 | 100% |

As demonstrated from the table above, the Matrimid polyimide does not form a clear homogenous composition when the lithium salt concentration is 64%. Moreover, the Matrimid polyimide does not form a clear homogenous composition even at substantially lower salt concentrations, such at a concentration of 0.5 moles of lithium salt per imide ring provided by the polyimide. Polyimides including a lithium salt in a concentration of 0.5 moles (or less) of lithium salt per imide ring provided by the polyimide generally lack sufficient minimum ionic conductivity to be a useful electrolyte separator for an electrochemical cell.

Although only data for polyimides shown in FIGS. 1(b), (c) and (m) are provided above, all polyimides shown in FIG. 1 ((a) through (m)) have been shown to form homogenous, substantially clear films having optical properties as shown above for polyimides (b), (c) and (m). This PME property is desired for maximum film stability and ionic conductivity.

Example 2

Figure 7:
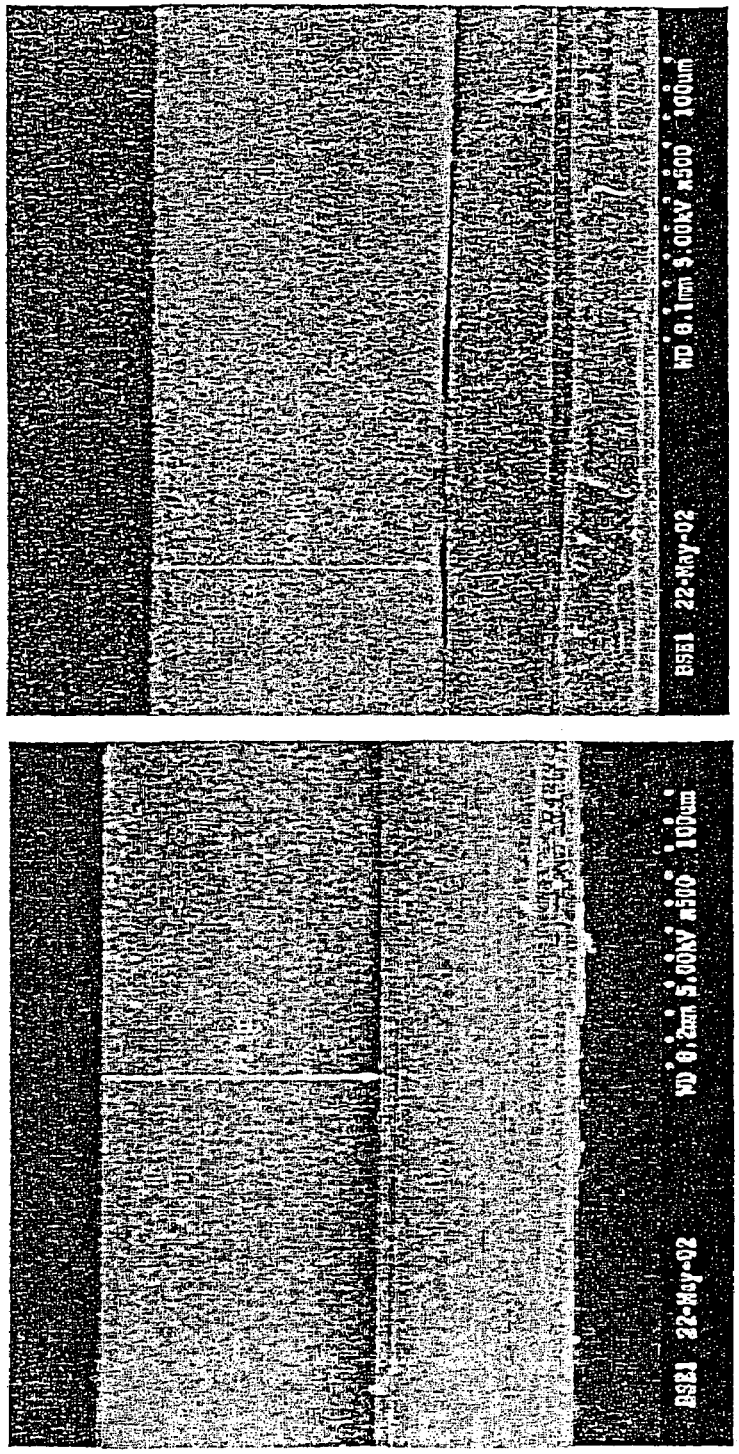
FIG. 7 is a SEM evidencing a defect free PME.

Scanning electron microscope (SEM) micrographs were taken to evaluate the morphology of the PME according to the invention. FIG. 7 shows two (2) SEM micrographs of the PME which each evidence a substantially defect free and a porosity free film. The thickness of the PME films shown were both about 75 µm.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A polymer matrix electrolyte (PME), comprising:
a polyimide, at least one lithium salt in a concentration of at least 0.5 moles of lithium per mole of imide ring provided by said polyimide, and at least one solvent all intermixed, wherein said polyimide is soluble at 25° C.

in said solvent and said PME is substantially optically clear.

2. The PME of claim 1, wherein said PME provides an optical clarity of at least 95% through a 1 mil film of said PME at 540 nm.

3. The PME of claim 1, wherein said electrolyte provides an optical clarity of at least 99% through a 1 mil film of said PME at 540 nm.

4. The PME of claim 1, wherein said lithium salt is selected from the group consisting of LiCl, LiBr, LiI, LiBOB, $LiClO_4$, $LiBF_4$, $LiAsF_6$, $LiPF_6$, $LiCF_3SO_3$, $LiN(CF_3SO_2)_2$ and lithium bis(trifluorosulfonyl)imide (LiTFSi).

5. The PME of claim 1, wherein a repeat unit weight per imide ring of said polyimide is no more than 350.

6. The PME of claim 1, wherein a repeat unit weight per imide ring of said polyimide is no more than 300.

7. The PME of claim 1, wherein a repeat unit weight per imide ring of said polyimide is no more than 250.

8. The PME of claim 1, wherein said polyimide is soluble at 25° C. in at least one solvent selected from the group consisting of N-methylpyrrolidinone (NMP), dimethylacetamide (DMAc) and dimethylformamide (DMF).

9. The PME of claim 1, wherein an ionic conductivity of said PME at 25° C. is at least $1\times10^{-4}$ S/cm.

10. The PME of claim 1, wherein an ionic conductivity of said PME at 25° C. is at least $3\times10^{-4}$ S/cm.

11. The PME of claim 1, wherein a concentration of said lithium salt is between 0.5 to 2.0 moles Li per mole of imide ring provided by said polyimide.

12. The PME of claim 1, wherein a concentration of said lithium salt is between 1.2 to 2.0 moles Li per mole of imide ring provided by said polyimide.

13. The PME of claim 1, wherein said salt and said polyimide do not provide any absorption peaks between 1630 and 1690 $cm^{-1}$, said PME providing at least one absorption between about 1630 and 1690 $cm^{-1}$.

14. A method of forming a polymer matrix electrolyte (PME), comprising the steps of:

dissolving a polyimide in at least one solvent, adding at least one lithium salt in a concentration of at least 0.5 moles of lithium per mole of imide ring provided by said polyimide to said polyimide and said solvent, wherein said polyimide, said salt and said solvent become intermixed, wherein said polyimide is soluble at 25° C. in said solvent and said PME is substantially optically clear.

* * * * *